(12) United States Patent
Kanno

(10) Patent No.: US 11,747,984 B2
(45) Date of Patent: *Sep. 5, 2023

(54) MEMORY SYSTEM THAT CONSTRUCTS VIRTUAL STORAGE REGIONS FOR VIRTUAL MACHINES

(71) Applicant: KIOXIA CORPORATION, Tokyo (JP)

(72) Inventor: Shinichi Kanno, Ota Tokyo (JP)

(73) Assignee: Kioxia Corporation, Tokyo (JP)

( * ) Notice: Subject to any disclaimer, the term of this patent is extended or adjusted under 35 U.S.C. 154(b) by 240 days.

This patent is subject to a terminal disclaimer.

(21) Appl. No.: 17/203,027

(22) Filed: Mar. 16, 2021

(65) Prior Publication Data

US 2021/0200442 A1 Jul. 1, 2021

Related U.S. Application Data

(63) Continuation of application No. 15/690,188, filed on Aug. 29, 2017, now Pat. No. 10,983,701.

(30) Foreign Application Priority Data

Dec. 21, 2016 (JP) .................................. 2016-247808

(51) Int. Cl.
*G06F 12/00* (2006.01)
*G06F 3/06* (2006.01)
(Continued)

(52) U.S. Cl.
CPC ............ *G06F 3/0611* (2013.01); *G06F 3/061* (2013.01); *G06F 3/0637* (2013.01); *G06F 3/0644* (2013.01); *G06F 3/0655* (2013.01); *G06F 3/0688* (2013.01); *G06F 9/45558* (2013.01); *G06F 12/0246* (2013.01); (Continued)

(58) Field of Classification Search
CPC ...... G06F 3/0611; G06F 3/061; G06F 3/0637; G06F 3/0644; G06F 3/0655; G06F 3/0688; G06F 9/45558; G06F 12/0246; G06F 12/0638; G06F 2009/45583; G06F 2212/205; G06F 2212/7202
See application file for complete search history.

(56) References Cited

U.S. PATENT DOCUMENTS 9,021,200 B1 4/2015 Kushmerick
9,594,770 B1 3/2017 Kushmerick et al.
(Continued)

FOREIGN PATENT DOCUMENTS

JP 2012-078940 A 4/2012
JP 2016-024678 A 2/2016
(Continued)

*Primary Examiner* — David Yi
*Assistant Examiner* — Tahilba O Puche
(74) *Attorney, Agent, or Firm* — Kim & Stewart LLP

(57) ABSTRACT

A memory system connectable to a host includes a nonvolatile memory and a controller. The controller is configured to generate one or more virtual storage regions each of which is associated with a virtual machine running in the host, using physical memory regions of the nonvolatile memory, maintain a threshold value for each of said one or more virtual storage regions, determine a cumulative amount of data that have been written in each of said one or more virtual storage regions, and restrict writing of data with respect to a virtual storage region for which the cumulative amount exceeds the threshold value.

20 Claims, 16 Drawing Sheets

(51) Int. Cl.
  *G06F 9/455* (2018.01)
  *G06F 12/06* (2006.01)
  *G06F 12/02* (2006.01)

(52) U.S. Cl.
  CPC ............ *G06F 12/0638* (2013.01); *G06F 2009/45583* (2013.01); *G06F 2212/205* (2013.01); *G06F 2212/7202* (2013.01)

(56) References Cited

U.S. PATENT DOCUMENTS

| | | |
|---|---|---|
| 9,983,807 B1 | 5/2018 | Tylik et al. |
| 2012/0023305 A1 | 1/2012 | Satoyama et al. |
| 2012/0084510 A1 | 4/2012 | Kurashige |
| 2013/0067187 A1 | 3/2013 | Moss et al. |
| 2013/0191601 A1 | 7/2013 | Peterson et al. |
| 2014/0136809 A1 | 5/2014 | Engle et al. |
| 2014/0281126 A1 | 9/2014 | Bleyer et al. |
| 2014/0379958 A1 | 12/2014 | Bealkowski et al. |
| 2016/0027518 A1 | 1/2016 | Zettsu |
| 2016/0124682 A1 | 5/2016 | Koizumi |
| 2016/0239226 A1 | 8/2016 | Sunaga |
| 2016/0246521 A1 | 8/2016 | Dewitt et al. |
| 2016/0313943 A1 | 10/2016 | Hashimoto et al. |
| 2017/0024132 A1 | 1/2017 | Jun et al. |
| 2017/0097784 A1 | 4/2017 | Iida |
| 2017/0102874 A1 | 4/2017 | Ouchi et al. |

FOREIGN PATENT DOCUMENTS

| | | |
|---|---|---|
| JP | 2016-091050 A | 5/2016 |
| JP | 2016-149048 A | 8/2016 |
| WO | 2015/194033 A1 | 12/2015 |

FIG. 6

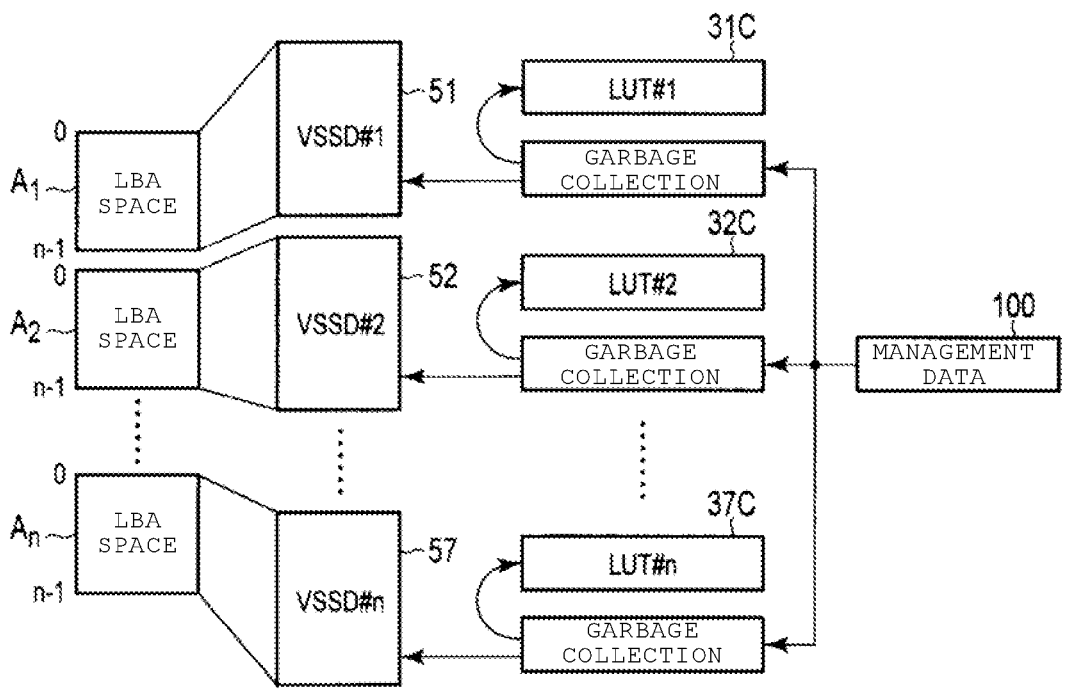

FIG. 7

VSSD MANAGEMENT COMMAND

| PARAMETER | DESCRIPTION |
|---|---|
| CREATE/REMOVE | 0h: CREATE<br>1h: REMOVE |
| capacity | CAPACITY OF VSSD (USER CAPACITY) |
| over-provisioning | over-provisioning OF VSSD |
| EXECUTION TIME OF NAND PROCESSING | UPPER LIMIT VALUE OF EXECUTION TIME OF PROCESSING (ERASURE, WRITE, READ) WITHIN NAND FLASH MEMORY |
| AMOUNT OF MEMORY RESOURCES | AMOUNT OF MEMORY (DRAM) RESOURCES TO BE ALLOCATED TO VSSD |
| TOTAL AMOUNT OF DATA-WRITTEN-IN-SSD | TOTAL AMOUNT OF DATA WRITABLE IN VSSD |
| TOTAL AMOUNT OF WRITE-REQUESTED-DATA | TOTAL AMOUNT OF DATA WRITABLE BY HOST |
| HOST-SIDE ACCESS BAND WIDTH | BAND WIDTH BETWEEN HOST AND VSSD |

VSSD MANAGEMENT TABLE 30

| VSSD ID | capacity | over-provisioning | EXECUTION TIME OF NAND PROCESSING | AMOUNT OF MEMORY RESOURCES | TOTAL AMOUNT OF DATA-WRITTEN-IN-SSD | TOTAL AMOUNT OF WRITE-REQUESTED-DATA | HOST-SIDE ACCESS BAND WIDTH |
|---|---|---|---|---|---|---|---|
| 1 | | | | | | | |
| 2 | | | | | | | |
| 3 | | | | | | | |
| ⋮ | ⋮ | ⋮ | ⋮ | ⋮ | ⋮ | ⋮ | ⋮ |
| n | | | | | | | |

MEMORY SYSTEM THAT CONSTRUCTS VIRTUAL STORAGE REGIONS FOR VIRTUAL MACHINES

CROSS-REFERENCE TO RELATED APPLICATIONS

This application is a continuation of U.S. patent application Ser. No. 15/690,188, filed on Aug. 29, 2017, which is based upon and claims the benefit of priority from Japanese Patent Application No. 2016-247808, filed on Dec. 21, 2016, the entire contents of each of which are incorporated herein by reference.

FIELD

Embodiments described herein relate generally to a technology for controlling a nonvolatile memory.

BACKGROUND

Today, a memory system including a nonvolatile memory is widely spread. A memory system of one type is a NAND flash technology based-solid state drive (SSD). The SSD is used as storage for various computers because of its low power consumption and high speed performance.

Recently, the SSD is also used as storage for storing large-capacity data in a server of a data center. Improvement of I/O performance of the server (host) may be caused by high-speed access performance provided by the SSD. In the data center, it is necessary to provides flexible storage service suitable for various storage requirements of individual users' needs. For that reason, a processing amount that needs to be executed in the server side for operation and management of the storage tends to increase.

Accordingly, a memory system for the data center is desired to have a function of supporting storage management by the server (host).

BRIEF DESCRIPTION OF THE DRAWINGS

FIG. 6 illustrates storage area (VSSD) management in the memory system according to the embodiment.

FIG. 7 illustrates details of a storage area (VSSD) management command applied to the memory system according to the embodiment.

DETAILED DESCRIPTION

An embodiment provides a memory system and a control method that support storage management by a host.

In general, according to an embodiment, a memory system connectable to a host includes a nonvolatile memory and a controller. The controller is configured to generate one or more virtual storage regions each of which is associated with a virtual machine running in the host, using physical memory regions of the nonvolatile memory, maintain a threshold value for each of said one or more virtual storage regions, determine a cumulative amount of data that have been written in each of said one or more virtual storage regions, and restrict writing of data with respect to a virtual storage region for which the cumulative amount exceeds the threshold value.

In the following, embodiments will be described with reference to the drawings.

Figure 1:
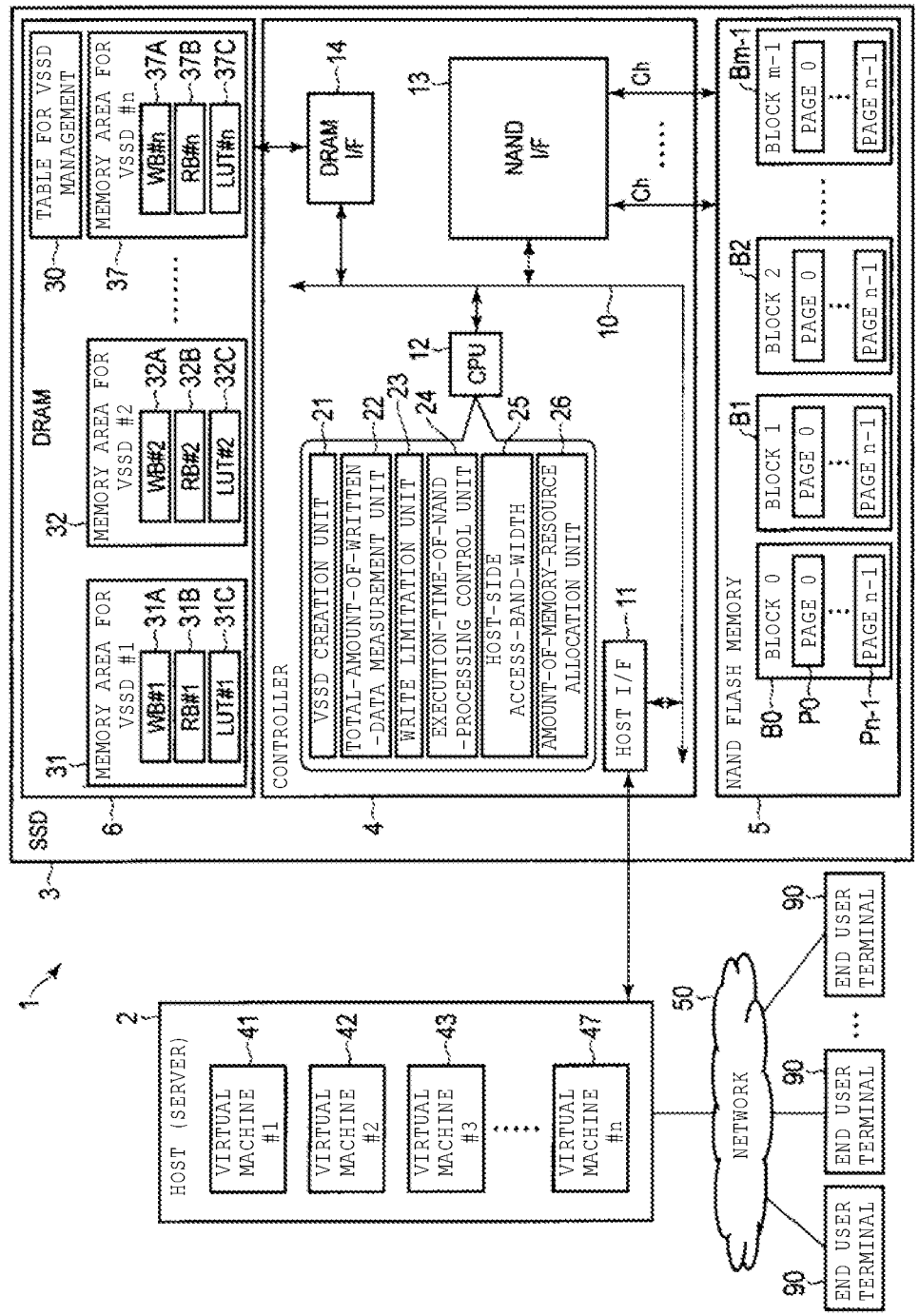
FIG. 1 is a block diagram of a memory system of an embodiment.

First, a configuration of an information processing system 1 including a memory system according to an embodiment will be described with reference to FIG. 1.

The memory system is a semiconductor storage device configured to write data into a nonvolatile memory and read data from the nonvolatile memory. The memory system is configured with, for example, a NAND flash technology based-solid state drive (SSD) 3.

The information processing system 1 includes a host (host device) 2 and an SSD 3. The host 2 is an information processing device such as a server, a personal computer, or the like. Typical examples of the server functioning as the host 2 may include a server in a data center.

In a case where the host 2 is the server in the data center, the host 2 may be connected to a plurality of end user terminals 90 through a network 50. The host 2 is able to provide various services to the end user terminals 90.

Examples of services provided by the host (server) 2 include (1) platform as a service that provides a system development platform to each client (e.g., end user terminal 90), (2) infrastructure as a service that provides infrastructure such as a virtual server to the client, and the like.

A plurality of virtual machines 41, 42, 43, . . . , and 47 may be executed on a physical server functioning as the host 2. Each of the virtual machines 41, 42, 43, . . . , and 47 is able to function as a virtual server configured to provide various services to the corresponding client.

A container-type virtualized environment may be applied to the host 2. In this case, each of a plurality of containers is arranged on an operating system of the host 2. Each of the containers is able to include an independent resource for executing an application and execute a function equivalent to a virtual machine.

The SSD 3 may be used as a main storage of an information processing device functioning as the host 2. The SSD 3 may be built in the information processing device and may also be connected to the information processing device through a cable or a network.

As an interface for interconnecting the host 2 and the SSD 3, a SCSI, a serial attached SCSI (SAS), an ATA, a serial ATA (SATA), a PCI Express (PCIe), Ethernet®, a fibre channel, NVM Express (NVMe®), and the like may be used.

The SSD 3 includes a controller 4 and a nonvolatile memory (e.g., NAND flash memory) 5. The SSD 3 may include a random access memory, for example, a DRAM 6.

The NAND flash memory 5 includes a memory cell array having a plurality of memory cells arranged in a matrix. The NAND flash memory 5 may be a NAND flash memory having a two-dimensional structure or a NAND flash memory having a three-dimensional structure.

The memory cell array of the NAND flash memory 5 includes a plurality of physical blocks B0 to Bm−1. Each of the physical blocks B0 to Bm−1 is composed of a large number of pages (here, page P0 to Pn−1). Each of the physical blocks B0 to Bm−1 functions as an addressable minimum erasure unit. The physical block may also be referred to as an "erasure block", a "physical erasure block", or simply a "block". Each of the pages P0 to Pn−1 includes a plurality of memory cells connected to the same word line. Each of the pages P0 to Pn−1 is a unit of a data write operation and a unit of a data read operation.

The controller 4 is electrically connected to the NAND flash memory 5 which is a nonvolatile memory through a NAND interface 13 such as Toggle, ONFI, or the like. The NAND interface 13 functions as a NAND control circuit configured to control the NAND flash memory 5.

Figure 2:
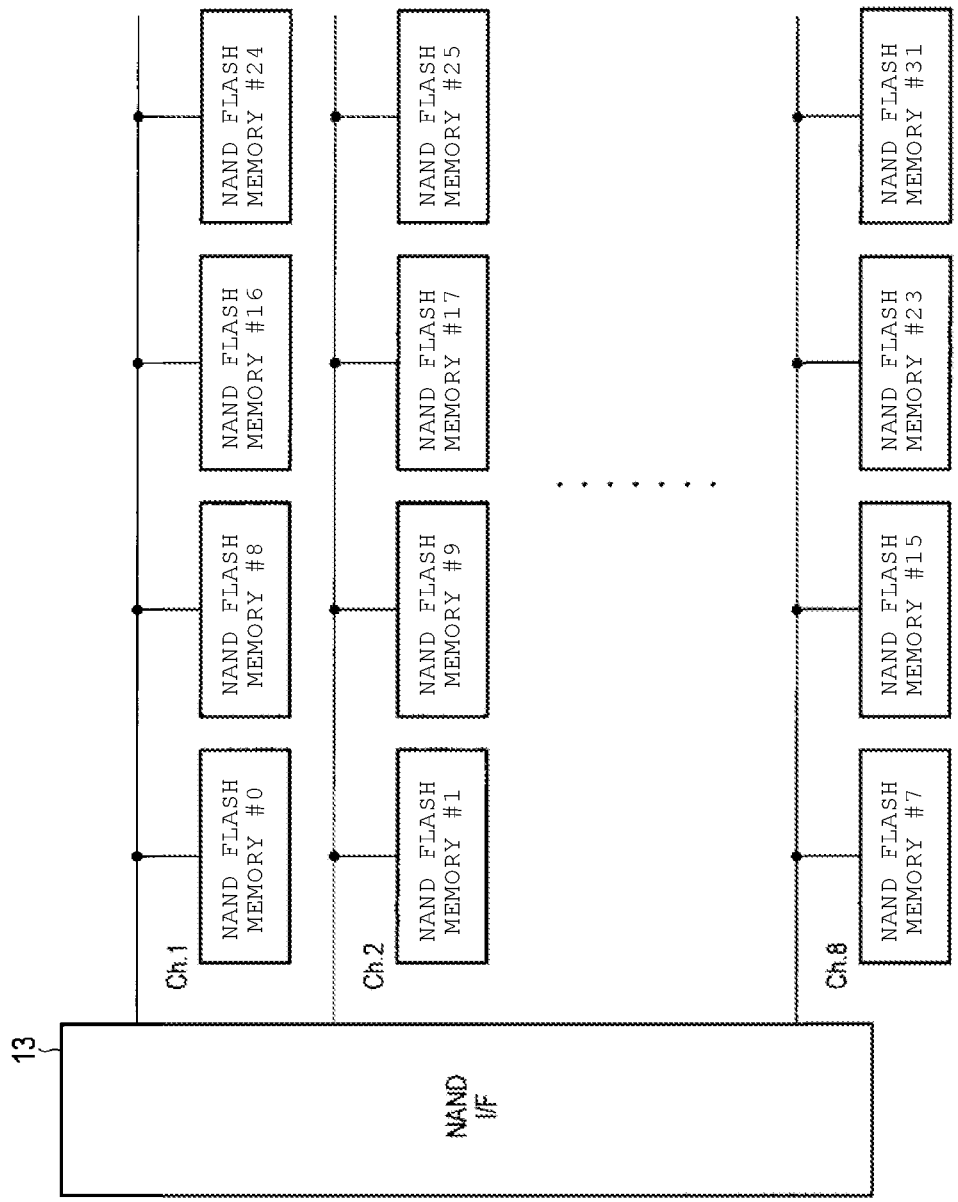
FIG. 2 is a block diagram of a plurality of NAND flash memory chips and a NAND interface within the memory system of the embodiment.

The NAND flash memory 5, as illustrated in FIG. 2, may include a plurality of NAND flash memory chips. Each NAND flash memory chip may operate independently. For that reason, the NAND flash memory chip functions as the minimum unit capable of being operated in parallel. In FIG. 2, eight channels Ch.1 to Ch.8 are connected to the NAND interface 13 and four NAND flash memory chips are connected to each of eight channels Ch.1 to Ch.8. In this case, a maximum of thirty-two NAND flash memory chips may operate in parallel.

In the present embodiment, the controller 4 in the SSD 3 includes a virtualization support mechanism for supporting storage management by the host 2. The virtualization support mechanism is a mechanism for supporting storage virtualization by the host 2. The virtualization support mechanism allows a plurality of virtual servers such as the virtual machines 41, 42, 43, . . . , and 47 to share physical resources of the SSD 3 and allows the plurality of virtual servers such as the virtual machines 41, 42, 43, . . . , and 47 to directly access the physical resources of the SSD 3.

The virtualization support mechanism arranges a plurality of storage areas whose capacity/performance/availability/number can be freely set in the SSD 3 and provides the storage areas to each virtual machine on the host 2. The storage area may be obtained by logically dividing the NAND flash memory 5. The mapping between the virtual machines and the storage areas in the SSD 3 may be 1:1 or may also be 1:n (n is 2 or more), that is, one or more storage areas in the SSD 3 to a single virtual machine may be allocated as storage resources (e.g., virtual disks) dedicated for the virtual machine.

Here, the virtual disk means a type of a file recognized as a physical disk by a guest operating system executed on the virtual machine. Each virtual machine is able to handle a virtual disk allocated to the virtual machine as the physical disk.

The SSD 3 including the virtualization support mechanism is able to create and manage various storage areas (in the following, also referred to as virtual SSD (VSSD)) among which features relating to capacity, performance, availability and the like are different from each other. The SSD 3 including the virtualization support mechanism is able to remove a virtual SSD (VSSD) for which a removal request is made by the host 2. A free area in the NAND flash memory 5 increased due to the removal of the virtual SSD (VSSD) may be used for creation of a new virtual SSD (VSSD).

The virtual SSD (VSSD) has a function equivalent to that of the virtual disk. Accordingly, the SSD 3 including the virtualization support mechanism allows an emulation function for creating and managing the virtual disk to be offloaded from the host 2 to the SSD 3. From this, it is possible to reduce a processing amount that needs to be executed by the host 2 for the storage management and as a result, improvement of I/O performance of the host 2 is able to be achieved.

The controller 4 is also able to function as a flash translation layer (FTL) configured to execute data management of the NAND flash memory 5 and block management of the NAND flash memory 5.

In the data management executed by the FTL, (1) management of mapping information indicating correspondence between respective logical addresses and respective physical addresses of the NAND flash memory 5, (2) processing for concealing read/write operation of page unit and of erasure operation physical block unit, and the like are included. The logical address is an address used by the host 2 for designating an address of the SSD 3. As the logical address, a logical block address (LBA) is normally used.

Management of mapping between respective LBAs and respective physical addresses is executed using a lookup table (LUT) functioning as an address translation table (logical and physical address translation table).

In the present embodiment, the controller 4 uses a plurality of lookup tables (LUTs) 31C, 32C, . . . , and 37C, which respectively correspond to a plurality of virtual SSDs (VSSD #1, VSSD #2, . . . , and VSSD #n), to manage mapping between respective LBAs and physical addresses of respective virtual SSDs (VSSDs).

A physical address corresponding to a certain LBA indicates a physical storage location in the NAND flash memory 5 in which data of the LBA are written. The lookup tables (LUTs) 31C, 32C, . . . , and 37C may be loaded onto the DRAM 6 from the NAND flash memory 5 of the SSD 3 when the SSD3 is powered on. In general, a size of each lookup table is relatively large. For that reason, at least a portion of each lookup table may be stored as an address translation table cache in the DRAM 6.

When a cache line which includes a physical address of interest corresponding to the logical address designated by a read command from the host 2 is present in the address translation table cache (cache hit), data are immediately read from a physical storage location in the NAND flash memory 5 designated by the physical address of interest.

On the other hand, when the cache line which includes a physical address of interest is not present in the address translation table cache (cache miss), a portion of data in the lookup table including the physical address of interest is read from the NAND flash memory 5. Contents of a replacement target cache line in the address translation table cache are expelled from the address translation table cache. Instead, the address translation table portion read from the NAND flash memory 5 is stored in the cache line. Data are read from the physical storage location in the NAND flash memory 5 designated by the physical address of interest.

In each virtual SSD (VSSD), writing of data into a page is allowed only once per a single erasure cycle. For that reason, the controller 4 writes update data corresponding to a certain LBA into a separate physical storage location instead of a physical storage location in which previous data corresponding to the LBA are stored. The controller 4 updates the lookup table (LUT) corresponding to the VSSD, associates the LBA with the separate physical storage location, and invalidates the previous data.

In the block management, bad block management, wear leveling, garbage collection, and the like are included.

The wear leveling is an operation for uniformizing consumption of respective physical blocks.

In the garbage collection, valid data in several target blocks (target physical blocks) in which valid data and invalid data coexist are copied to a separate physical block (for example, free block) in order to increase the number of data writable free blocks. Here, the valid data mean data having a possibility of being referenced later. The invalid data mean data which are no longer referenced. For example, data associated with a certain LBA are valid data and data that are not associated with any LBA are invalid data. In the garbage collection, respective LBAs of the copied valid data are mapped to correct physical addresses. Valid data are copied to a separate physical block and thus, a physical block which becomes filled with only invalid data are released as a free block. From this, the physical block is able to be reused after the erasure operation for the physical block is executed.

In the present embodiment, garbage collection may be independently executed for each virtual SSD (VSSD). With this, for example, even when garbage collection for a certain virtual SSD (VSSD) is being executed, it is possible to significantly reduce a possibility that the garbage collection adversely influences on a normal access to another virtual SSD (VSSD). As a result, it is possible to solve a so-called a noisy neighbor problem.

Next, a configuration of the controller 4 will be described.

The controller 4 includes a host interface 11, a CPU 12, a NAND interface 13, a DRAM interface 14, and the like. The CPU 12, the NAND interface 13, and the DRAM interface 14 are connected to each other through a bus 10.

The host interface 11 is a host interface circuit configured to execute communication with the host 2. The host interface 11 may be, for example, a PCIe controller (NVMe controller). The host interface 11 receives various commands (write command, the read command, VSSD management command, UNMAP command, or the like) from the host 2.

The write command requests the SSD 3 to write data designated by the write command. The write command may include a start LBA, a transfer length, and a VSSD ID. The VSSD ID in the write command is an identifier for uniquely identifying a VSSD into which data are to be written. The read command requests the SSD 3 to read data designated by the read command. The read command may include a start LBA, a transfer length, and a VSSD ID. The VSSD ID in the read command is an identifier for uniquely identifying a VSSD from which data are to be read.

In a case where each of a plurality of VSSDs is previously associated with each virtual machine on the host 2, the write command/the read command may include a virtual machine ID instead of an ID of a VSSD. The virtual machine ID is an identifier of a virtual machine which issues a write request (write command)/a read request (read command). When the controller 4 receives a write command including a certain virtual machine ID, the controller 4 writes data into the VSSD associated with the virtual machine ID.

The VSSD management command is a command which requests the SSD 3 to create or remove a VSSD. The VSSD management command includes various parameters for providing a VSSD suitable for storage requirements of an individual user (also referred to as "end user") to a virtual machine. These parameters allow functions for controlling QoS of each VSSD to be provided to the host 2. More specifically, these parameters are used for freely setting a capacity, performance, availability or the like of the VSSD. The host 2 uses the VSSD management command so as to make it possible to designate requirements relating to the capacity, the performance, and the availability of the VSSD to be created. The SSD 3 is able to create the VSSD which satisfies requirements relating to the capacity, performance, availability designated by the host 2. Accordingly, a data center operator is able to freely set performance or the like of the storage (VSSD) to be provided to individual end users according to individual end users' needs.

The CPU 12 is a processor configured to control the host interface 11, the NAND interface 13, and the DRAM interface 14. The CPU 12 executes command processing for processing various commands from the host 2 or the like, in addition to processing of the FTL described above.

These FTL processing and command processing may be performed by the CPU 12 executing firmware. The firmware causes the CPU 12 to function as a VSSD creation unit 21, a total-amount-of-written-data measurement unit 22, a write limitation unit 23, an execution-time-of-NAND-processing control unit 24, a host-side access-band-width control unit 25, and an amount-of-memory-resource allocation unit 26.

The VSSD creation unit 21 has a multi-VSSD management function for managing a plurality of VSSDs. Each VSSD corresponds to a type of a storage area in the NAND flash memory 5 which is nonvolatile memory. Each VSSD is configured with several physical blocks allocated for the VSSD. In each of the physical blocks allocated for the VSSD, data (e.g., data from virtual machine associated with the VSSD) which are only associated with the VSSD are stored, and data (e.g., data from other virtual machines) associated with other VSSDs are not stored. In other words, each physical block in the NAND flash memory 5 stores only data corresponding to a single VSSD.

The VSSD creation unit 21 creates a plurality of VSSDs, that is, a plurality of storage areas based on a creation request for each VSSD from the host 2. In other words, the VSSD creation unit 21 logically divides the NAND flash memory 5 into a plurality of storage areas (VSSDs) based on a creation request for each VSSD from the host 2.

The host 2 is able to use the VSSD management command described above to request the SSD 3 to create each VSSD. The VSSD creation unit 21 is able to create each VSSD which satisfies requirements relating to the capacity, the performance, and the availability designated by the host 2.

The host 2 issues several VSSD management commands to the SSD 3 to thereby make it possible to designate parameters relating to the capacity, the performance, and the availability for each VSSD.

As examples of the parameters relating to the availability and the like of the VSSD, the total amount of data capable of being written into the VSSD may be included. The total amount of data capable of being written into the VSSD indicates an upper limit value of the total amount of data capable of being written into the VSSD.

Normally, an increase in a total amount of data written into a certain VSSD causes an increase in the number of rewriting times (in particular, number of program-erase cycle) of each physical block in the VSSD, that is, a consumption degree of a VSSD is increased as a total amount of data written into the VSSD becomes larger. This is because the number of program-erase cycles of each physical block in the VSSD increases more as a total amount of data written into a VSSD becomes larger to thereby increase the consumption degree of the VSSD.

Accordingly, when a total amount of data to be written is unlimited, an unavailable physical block (referred to as "bad block") is increased due to an excessive increase in a consumption degree of a specific VSSD and as a result, deterioration in the service life of the SSD 3 may be caused.

Also, when a total amount of data to be written is unlimited, a band width used for communication between the SSD 3 and the host 2 may be exclusively used by a large amounts of I/O directed from a specific virtual machine to a specific VSSD and as a result, I/O performance of each of other virtual machines may be reduced.

The host 2 distributes the total amount of writable data to each VSSD to control QoS of an individual VSSD.

For example, in a case where the host 2 requests creation of a VSSD for a virtual machine which handles hot data, which is a type of data frequently updated, the host 2 may also designate a large volume of the total amount of writable data. This is because regarding a VSSD into which data having high update frequency are written, there is high possibility that the total amount of data to be written into the VSSD increases. On the other hand, for example, in a case where the host 2 requests creation of a VSSD for a virtual machine which handles cold data, which is a type of data having low update frequency, the host 2 may also designate a small volume of the total amount of writable data. The data center operator may charge a more expensive VSSD utilization charge (e.g., in the form of an increased rental fee) to an end user who requests a VSSD having a large volume of the total amount of writable data, that is, a VSSD for which a large volume of the total write amount is permitted and may charge a less expensive VSSD utilization charge to an end user who requests a VSSD having a small volume of the total amount of writable data, that is, a VSSD for which a large volume of the total write amount is not permitted. Each end user is able to utilize a VSSD having a total write amount suitable for workloads of the user.

The VSSD creation unit 21 manages an upper limit value that indicates an upper limit (e.g., upper limit of the total write amount) of the total amount of writable data for each VSSD, based on the request from the host 2 which designates the total amount of writable data (e.g., total write amount) for each VSSD.

The total-amount-of-written-data measurement unit 22 measures a total amount of data written into each VSSD, i.e., a cumulative total amount of data that have been written into each VSSD. In a case where VSSD #1, VSSD #2, . . . , and VSSD #n are created in the SSD 3, the total-amount-of-written-data measurement unit 22 separately measures each of a total amount of data written into the VSSD #1, a total amount of data written into the VSSD #2, and a total amount of data written into the VSSD #n.

For example, the total-amount-of-written-data measurement unit 22 may measure a sum of a total amount of data written into the VSSD #1 from the host 2 and a total amount of data written into the VSSD #1 by the garbage collection for the VSSD #1 as a total amount of data written into the VSSD #1. Similarly, the total-amount-of-written-data measurement unit 22 may measure a sum of a total amount of data written into the VSSD #2 from the host and a total amount of data written into the VSSD #2 by the garbage collection for the VSSD #2 as a total amount of data written into the VSSD #2. According to this operation, it is possible to limit the upper limit of the total amount of data capable of being written into each VSSD by also taking into account garbage collection for each VSSD.

The total-amount-of-written-data measurement unit 22 may measure the total amount of data written into the VSSD #1 from the host 2 as the total amount of data written into the VSSD #1 and measure the total amount of data written into the VSSD #2 from the host 2 as the total amount of data written into the VSSD #2.

The VSSD management command may selectively use the following two parameters with which the upper limit value of the total amount of data capable of being written into a VSSD can be designated.

(1) a parameter which designates a total-write-amount-in-SSD (2) a parameter which designates a total amount of write-requested-data The parameter which designates a total-write-amount-in-SSD designates an upper limit value of the sum of the total amount of data capable of being written into the VSSD from the host 2 and the total amount of data capable of being written into the VSSD by garbage collection for the VSSD. This parameter is used for limiting the upper limit of the total amount of data capable of being written into each VSSD by also taking into account garbage collection for each VSSD. Only when the total-write-amount-in-SSD for a certain VSSD is designated, the total-amount-of-written-data measurement unit 22 may measure the sum of the total amount of data written into the VSSD from the host 2 and the total amount of data written into the VSSD by garbage collection for the VSSD as the total amount of data written into the VSSD.

The parameter which designates a total amount of write-requested-data designates an upper limit value of the total amount of data capable of being written into the VSSD from the host 2. This parameter is used for limiting the upper limit of the total amount of data capable of being written into each VSSD from the host 2. Only when total amount of write-requested-data is designated to a certain VSSD, the total-amount-of-written-data measurement unit 22 may measure the total amount of data written into the VSSD from the host 2 as the total amount of data written into the VSSD.

In a case where a measured total amount of data written into the VSSD #1 reaches the upper limit value of the total amount of data capable of being written into the VSSD #1, the write limitation unit 23 limits writing (i.e., further writing) of data into the VSSD #1 from the host 2. With this, it is possible to prevent data of which amount exceeds the total write amount for the VSSD #1 designated by the host 2 from being written into the VSSD #1. An end user corresponding to the virtual machine which uses the VSSD #1 may request the data center operator to increase the total amount of writable data. The data center operator may charge an extra usage charge to the end user and may transmit a VSSD management command, which is for resetting the VSSD #1 such that the total amount of data capable of being written into the VSSD #1 is increased, to the SSD 3.

In a case where a measured total amount of data written into the VSSD #2 reaches the upper limit value of the total amount of data capable of being written into the VSSD #2, the write limitation unit 23 limits writing of data into the VSSD #2 from the host 2. According to this operation, it is possible to prevent data of which amount exceeds the total write amount for the VSSD #2 designated by the host 2 from being written into the VSSD #2.

Similarly, in a case where a measured total amount of data written into the VSSD #n reaches the upper limit value of the total amount of data capable of being written into the VSSD #n, the write limitation unit 23 limits writing of data into the VSSD #n from the host 2. According to this operation, it is possible to prevent data of which amount exceeds the total write amount for the VSSD #n designated by the host 2 from being written into the VSSD #n.

The controller 4 of the SSD 3 is able to report the measured total amount of written data (i.e., total-write-amount-in-SSD and/or total amount of write-requested-data) for each VSSD to the host 2. For example, in a case where a request to acquire the total write amount (i.e., total-write-amount-in-SSD and/or total amount of write-requested-data) for a certain VSSD is issued from the host 2, the controller 4 reports the total write amount (i.e., total-write-amount-in-SSD and/or total amount of write-requested-data) to the host 2.

Examples of parameters relating to a capacity of a VSSD may include a user capacity and an over-provisioning capacity. The user capacity corresponds to a user accessible LBA space. The over-provisioning means allocating a storage capacity in the SSD 3, which is not recognizable as an available user space (i.e., user accessible LBA space) from the host 2. The over-provisioning capacity is a storage capacity in the SSD 3 which is not recognizable as an available user space from the host 2. The user space accessible by an end user becomes larger as the user capacity increases. Performance and durability of a VSSD is improved as a ratio of the over-provisioning capacity to the user capacity increases.

In a case where the host 2 intends to request creation of a VSSD for which high durability is needed, the host 2 may designate the over-provisioning capacity which amounts to, for example, 50 to 100 percent of the user capacity. On the other hand, in a case where the host 2 intends to request creation of a VSSD for which high durability is not needed, the host 2 may designate the over-provisioning capacity which amounts to, for example, zero to several percent of the user capacity.

The host 2 may designate a user capacity of a VSSD and a percentage indicating a ratio of an over-provisioning capacity to the user capacity in order to designate a set of a user capacity of a VSSD and an over-provisioning capacity of the VSSD. Alternatively, the host 2 may designate a user capacity of a VSSD and the number of physical block to be allocated to the VSSD in order to designate a set of the user capacity of the VSSD and an over-provisioning capacity of the VSSD. In the latter case, the remaining capacity obtained by deducting the user capacity from a capacity corresponding to the number of physical blocks allocated to the VSSD corresponds to an actual over-provisioning capacity.

The data center operator may charge a more expensive VSSD rental fee to an end user who requests a VSSD having high durability and charge a less expensive VSSD rental fee to the end user who does not request the VSSD having high durability.

The VSSD creation unit 21 allocates a capacity of the sum of the user capacity and over-provisioning capacity to an individual VSSD based on a request from the host 2 that designates a set of the user capacity and the over-provisioning capacity for each VSSD. In a case where the number of physical blocks to be allocated to a VSSD is designated by the host 2, the VSSD creation unit 21 may secure the designated number of physical blocks for the VSSD. A total capacity corresponding to the number of secured physical blocks are allocated to the VSSD and becomes the capacity of the sum of the user capacity and over-provisioning capacity.

Examples of parameters relating to performance of a VSSD may include an execution time of NAND processing (e.g., NAND band width or NAND bit rate). The execution time of NAND processing is an upper limit value of execution time of an erasure operation, a write operation or a read operation of the NAND flash memory 5 per unit time. In a case where the host 2 intends to request creation of a VSSD for which high speed access performance is needed, the host 2 may designate a large upper limit value (i.e., long execution time of NAND processing) and in a case where the host 2 intends to request creation of a VSSD for which high speed access performance is not needed, the host 2 may designate a small upper limit value (i.e., short execution time of NAND processing).

The data center operator may charge a more expensive VSSD rental fee to an end user who requests a VSSD having high speed access performance and charge a less expensive VSSD rental fee to an end user who requests a VSSD for which high speed access performance is not needed.

The VSSD creation unit 21 manages the upper limit value of execution time of NAND processing, that is, the upper limit value of time for an erasure operation, a write operation or a read operation of the NAND flash memory 5 per unit time, for each VSSD based on a request from the host 2 that designates an upper limit value of execution time of NAND processing for each VSSD.

The execution-time-of-NAND-processing control unit 24 executes respective commands directed to each VSSD so that execution time for an erasure operation, a write operation or a read operation of each VSSD per unit time falls within the upper limit value of the designated execution time of NAND processing of each VSSD.

Examples of parameters relating to performance of a VSSD may include a band width (i.e., host-side access band width) between the host 2 and each VSSD.

The host 2 is able to designate a band width (i.e., bit rate) for communication with the host 2 for each VSSD. In a case where an interface connecting the host 2 and the SSD 3 is, for example, the PCIe, a maximum band width between the host 2 and the SSD 3 is 3.2 Gbps. Here, it is assumed that three VSSDs #1, #2, and #3 are created in the SSD 3. For example, the host 2 may designate a band width of 2 Gbps as a band width between the VSSD #1 and the host 2 (i.e., virtual machine #1 associated with VSSD #1), may designate a band width of 1.2 Gbps as a band width between the VSSD #2 and the host 2 (e.g., virtual machine #2 associated with VSSD #2), and may designate a band width of 1 Gbps as a band width between the VSSD #3 and the host 2 (e.g., virtual machine #3 associated with VSSD #3).

The host-side access-band-width control unit 25 sets a band width for communicating with the host 2 for each VSSD based on a request from the host 2 that designates a band width for communication with the host 2 for each VSSD. In this case, the host-side access-band-width control unit 25 executes respective commands directed to each VSSD so that an actual access band width between each VSSD and the host 2 falls within the designated host-side access band width of each VSSD.

For example, the host interface 11 (for example, PCIe controller) may cooperate with the host 2 so as to control a transfer rate between a single VSSD and a single virtual machine through a path. Alternatively, the controller 4 may control a rate that acquires commands from a plurality of command issuance queues corresponding to a plurality of VSSDs placed on the memory of the host 2 for each VSSD. Alternatively, the controller 4 may control a rate of execution of commands in a command queue in which commands received from the host 2 are stored, for each VSSD.

Examples of parameters relating to performance of a VSSD include an amount of memory resources of the DRAM 6 capable of being used for storing management data of each VSSD. For example, in a case where a plurality of VSSDs (i.e., VSSD #1, VSSD #2, . . . , and VSSD #n) is created, a plurality of memory areas 31, 32, . . . , and 37 corresponding to the plurality of VSSDs is secured in the DRAM 6.

In the memory area 31, at least a portion of management data for the VSSD #1 are stored. In the management data for the VSSD #1, a lookup table (i.e., logical and physical address translation table) 31C for the VSSD #1 is included. The memory area 31 functions as a cache area storing at least a portion of the lookup table 31C in the NAND flash memory 5. For that reason, a cache hit ratio is improved and an access speed with respect to the VSSD #1 becomes faster, as the size of the memory area 31 becomes larger. The memory area 31 may include a write buffer 31A for temporarily storing write data directed to the VSSD #1 from the host 2 and a read buffer 31B for temporarily storing data read from the VSSD #1.

In the memory area 32, at least a portion of management data for the VSSD #2 are stored. In the management data for the VSSD #2, a lookup table 32C for the VSSD #2 is included. The memory area 32 functions as a cache area storing at least a portion of the lookup table 32C in the NAND flash memory 5. For that reason, a cache hit ratio is improved and an access speed with respect to the VSSD #2 becomes faster, as the size of the memory area 32 becomes larger. The memory area 32 may include a write buffer 32A for temporarily storing write data directed to the VSSD #2 from the host 2 and a read buffer 32B for temporarily storing data read from the VSSD #2.

In the memory area 37, at least a portion of management data for the VSSD #n are stored. In the management data for the VSSD #n, a lookup table (37C for the VSSD #n is included. The memory area 37 functions as a cache area storing at least a portion of the lookup table 37C in the NAND flash memory 5. For that reason, a cache hit ratio is improved and an access speed with respect to the VSSD #n becomes faster, as the size of the memory area 37 becomes larger. The memory area 37 may include a write buffer 37A for temporarily storing write data directed to the VSSD #n from the host 2 and a read buffer 37B for temporarily storing data read from the VSSD #n.

The amount-of-memory-resource allocation unit 26 secures the memory area 31 having a first size in the DRAM 6 as a memory area for storing at least a portion of management data of the VSSD #1, and secures the memory area 32 having a second size in the DRAM 6 as a memory area for storing at least a portion of management data of the VSSD #2, based on a request from the host 2 that designates the amount of memory resources of the DRAM 6 for each VSSD.

The NAND interface 13 controls the NAND flash memory 5 under control of the CPU 12. The DRAM interface 14 is a DRAM controller configured to control the DRAM 6 under control of the CPU 12. A portion of the storage area of the DRAM 6 is used for storing the VSSD management table 30 which is used for managing each of the plurality of VSSDs.

Figure 3:
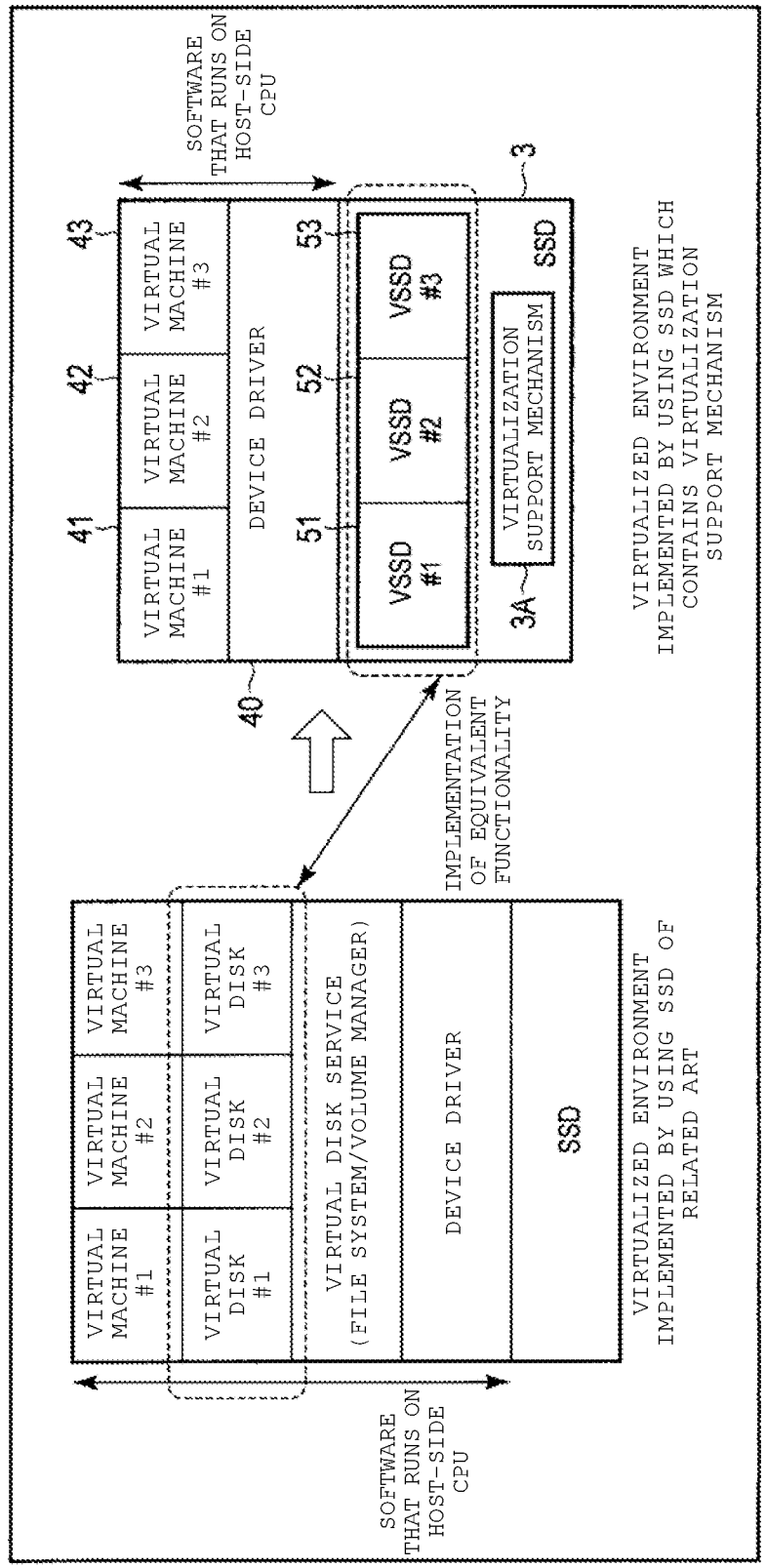
FIG. 3 schematically illustrates a virtualized environment implemented by using SSDs of the related art and a virtualized environment implemented by using the memory system (SSD which includes a virtualization support mechanism) according to the embodiment.

FIG. 3 illustrates a virtualized environment implemented by using the SSDs of the related art and a virtualized environment implemented by using the SSD 3 including a virtualization support mechanism 3A.

The left portion of FIG. 3 illustrates the virtualized environment implemented by using SSDs of the related art. In the virtualized environment implemented by using SSDs of related art, virtual disk service software is included in software that runs on the host side CPU and the virtual disk service software generates virtual disks #1, #2, and #3 from the physical storage (here, SSD) by emulation. That is, the virtual disk service software manages resources of the physical storage (here, SSD) as a logical storage pool, generates the virtual disks #1, #2, and #3 using the storage pool, and provides the virtual disks #1, #2, and #3 to the virtual machines #1, #2, and #3, respectively.

The right portion of FIG. 3 illustrates the virtualized environment implemented by using the SSD 3 which includes virtualization support mechanism 3A.

In the virtualized environment implemented by using the SSD 3 which includes virtualization support mechanism 3A, a VSSD 51, a VSSD 52, and a VSSD 53 are created in the SSD 3 by the virtualization support mechanism 3A the SSD 3.

These VSSD 51, VSSD 52, and VSSD 53 have functions equivalent to those of the virtual disks #1, #2, and #3. Accordingly, it becomes possible to remove emulation function that creates the virtual disks #1, #2, and #3 from software that runs on the host-side CPU. As a result, it is possible to simplify the configuration of software that runs on the host-side CPU to thereby make it possible to shorten a delay of processing in software and achieve improvement of I/O performance of the host. The physical resources of the SSD 3 are shared by the virtual machines 41, 42, and 43. The virtual machines 41, 42, and 43 are able to directly access the VSSD 51, the VSSD 52, and the VSSD 53 in the SSD 3 through the device driver 40.

Figure 4:
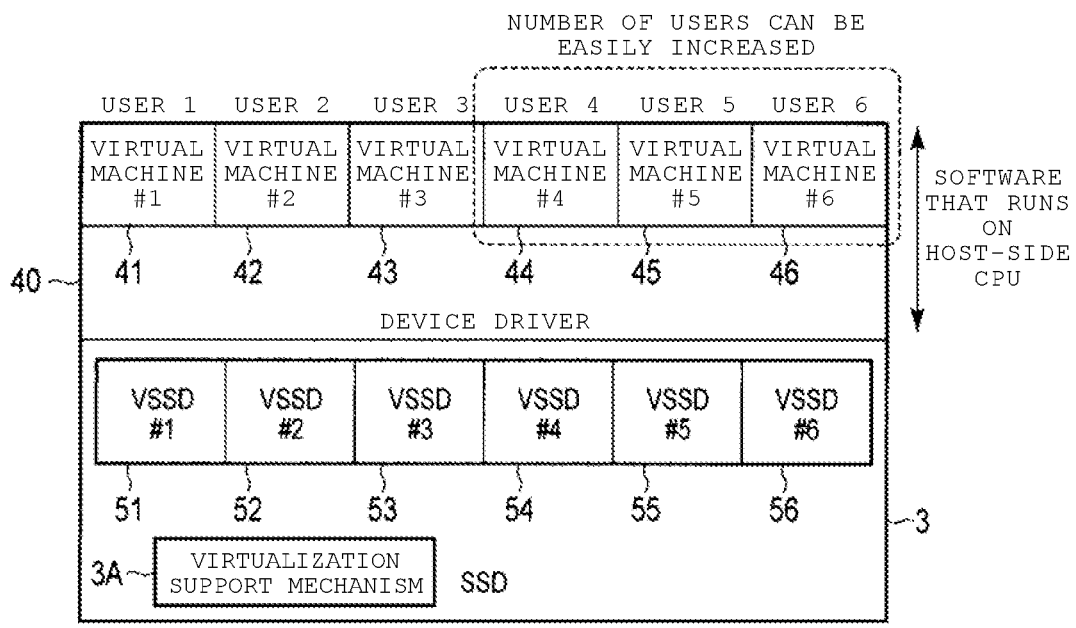
FIG. 4 illustrates a relationship between virtual machines in a host (server) and storage areas (virtual SSD (VSSDs)) in the memory system according to the embodiment.

FIG. 4 illustrates a relationship between the number of VSSDs in the SSD 3 and the number of host-side virtual machines.

In FIG. 4, six virtual machines 41 to 46 are executed in the host-side and six VSSDs 51 to 56 corresponding to the virtual machines 41 to 46 are created in the SSD 3. In the virtualized environment implemented by using the SSD 3 which includes virtualization support mechanism 3A, it is possible to simplify the configuration of software that runs on the host-side CPU and increase the number of the host-side virtual machines. According to this operation, it is possible to increase the number of users per a single host.

Figure 5:
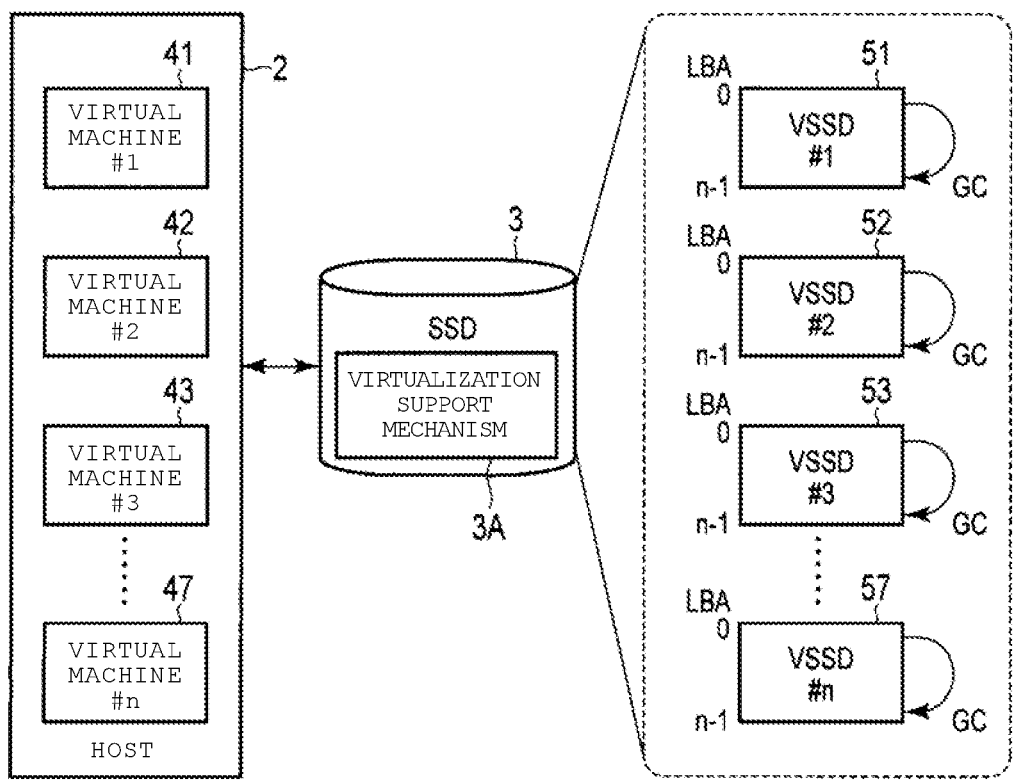
FIG. 5 schematically illustrates storage areas (VSSDs) in the memory system according to the embodiment.

Next, the VSSDs created in the SSD 3 will be described with reference to FIG. 5.

The virtualization support mechanism 3A of the SSD 3 creates a plurality of VSSDs 51, 52, . . . , and 57 that respectively correspond to the virtual machines 41, 42, . . . , and 47. In this case, the virtualization support mechanism 3A is able to manage a plurality of logical address spaces (e.g., LBA space) that respectively correspond to the plurality of VSSDs 51, 52, . . . , and 57.

Each VSSD may be realized by a name space. In this case, a plurality of name spaces is used in order to logically divide the storage area of the NAND flash memory 5 into a plurality of areas. Each name space is a storage area in the NAND flash memory 5 and a logical address range (e.g., LBA range) is allocated to each name space. An individual name space is identified by an identifier of the name space. In a case where each VSSD is realized by a name space, the LBA range (e.g., LBA 0 to LBA n−1) is allocated to each VSSD. A size (that is, number of LBAs) of the LBA range may be changed for each VSSD (i.e., name space). Each LBA range starts at LBA 0.

FIG. 6 illustrates VSSD management executed by the SSD 3.

Here, it is assumed that a plurality of VSSDs are realized by a plurality of name spaces. A logical address space (e.g., LBA space) A1 having addresses of 0 to n−1 is allocated to the VSSD 51. A logical address space (e.g., LBA space) A2 having addresses of 0 to n−1 is allocated to the VSSD 52. Similarly, a logical address space (e.g., LBA space) An having addresses of 0 to n−1 is allocated to the VSSD 57.

In the present embodiment, the lookup table LUT is divided to be corresponded to each VSSD. That is, the lookup tables LUT 31C to 37C corresponding to the VSSDs 51 to 57 are managed by the controller 4 of the SSD 3.

The lookup table LUT 31C manages mapping between the LBA space A1 of the VSSD 51 and the physical addresses of the NAND flash memory 5. The lookup table LUT 32C manages mapping between the LBA space A2 of the VSSD 52 and the physical addresses of the NAND flash memory 5. The lookup table LUT 37C manages mapping between the LBA space An of the VSSD 57 and the physical addresses of the NAND flash memory 5.

The controller 4 is able to independently perform garbage collection for each VSSD (i.e., storage area) by using the lookup tables LUT 31C to 37C. In the garbage collection for a certain VSSD, one or more physical blocks of a garbage collection target is selected from respective physical blocks allocated to the VSSD and valid data in each of the selected physical block are copied to the physical block (e.g., free block) allocated to the VSSD. The lookup table LUT corresponding to the VSSD is updated, and a correct physical address is associated with each LBA which corresponds to the copied data. Through garbage collection which is independent for each VSSD (i.e., storage area), it is possible to prevent data associated with a different VSSDs from being stored in the same physical block by the garbage collection.

Management data 100 may maintain information indicating a relationship between the VSSDs 51 to 57 and the number of physical blocks allocated to the VSSDs 51 to 57.

In the present embodiment, a free block generated by garbage collection is input to a free block pool shared among the VSSDs 51 to 57. According to this operation, each free block is able to be shared among the VSSDs 51 to 57.

FIG. 7 illustrates VSSD management commands.

The VSSD management commands are commands used for VSSD management including creation and removal of a VSSD. The VSSD management command may include the following parameters.

(1) create/remove
(2) capacity
(3) over-provisioning
(4) execution time of NAND processing
(5) amount of memory resources
(6) total-write-amount-in-SSD
(7) total amount of write-requested-data
(8) host-side access band width A value 0h of the create/remove parameter requests the SSD 3 to create a VSSD. A value 1h of the create/remove parameter requests the SSD 3 to remove the VSSD. In a case where removal of a VSSD is requested, a parameter which designates an identifier (e.g., VSSD ID) of a VSSD which is a removal target may be set in a VSSD management command.

The parameters of capacity, over-provisioning, execution time of NAND processing, amount of memory resources, total-write-amount-in-SSD, total amount of write-requested-data, and host-side access band width are parameters for freely setting a capacity, performance, and availability of a VSSD. The VSSD management commands are able to designate all parameters described above and at least a portion of the parameters described above.

The parameter of capacity designates a capacity (i.e., user capacity) to be allocated to a VSSD which is a creation target. The user capacity corresponds to a user accessible LBA space, as described above. The user capacity corresponds to the number of LBAs to be allocated to the VSSD. The user capacity may be designated using bytes and be designated using the number of LBAs to be allocate to the VSSD.

The parameter of over-provisioning designates an over-provisioning capacity to be allocated to a VSSD which is a creation target.

The parameter of execution time of NAND processing designates an upper limit value of execution time of processing in the NAND flash memory 5, that is, an upper limit value of execution time of an erasure operation, a write operation or a read operation of a VSSD which is a creation target VSSD per unit time.

The parameter of amount of memory resources designates an amount of a memory resource (e.g., DRAM 6) to be allocated to a VSSD which is a creation target.

The parameter of total-write-amount-in-SSD and the parameter of total amount of write-requested-data are parameters for designating the upper limit value of total amount of data capable of being written into a VSSD which is a creation target. The total amount of data capable of being written may be, for example, a total amount of writable data per a set period of time (for example, one day, one month and the like).

The host 2 may designate both the parameter of total-write-amount-in-SSD and the parameter of total amount of write-requested-data and may designate one of the parameter of total-write-amount-in-SSD and the parameter of total amount of write-requested-data in order to designate an upper limit value of the total amount of data capable of being written into a VSSD which is a creation target.

The parameter of total-write-amount-in-SSD designates an upper limit value of the sum of a total amount of data capable of being written into a VSSD, which is a creation target, from the host 2 and a total amount of data capable of being written into the VSSD by garbage collection for the VSSD.

The parameter of total amount of write-requested-data designates an upper limit value of a total amount of data capable of being written into a VSSD, which is a creation target, from the host 2.

The parameter of host-side access band width designates a band width, which is used for communicating with the host 2, between the host 2 and a VSSD which is a creation target.

Figures 8, 9:
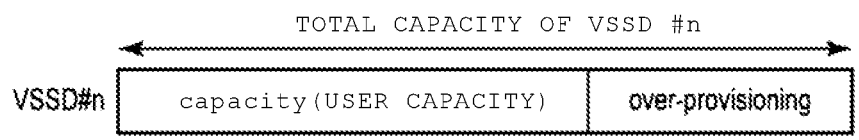
FIG. 8 illustrates a storage area (VSSD) management table managed by the memory system according to the embodiment.
FIG. 9 illustrates allocation of a user capacity and an over-provisioning capacity to an individual storage area (VSSD).

FIG. 8 illustrates a storage area (i.e., VSSD) management table 30.

The VSSD management table 30 includes a plurality of entries corresponding to the VSSDs 51 to 57 created by the VSSD creation unit 21. Each entry includes a "VSSD ID" field, a "capacity" field, an "over-provisioning" field, an "execution time of NAND processing" field, an "amount of memory resources" field, a "total-write-amount-in-SSD" field, a "total amount of write-requested-data" field, and a "host-side access bandwidth" field.

In the "VSSD ID" field, an identifier (e.g., VSSD ID) of a corresponding VSSD is stored.

In the "capacity" field, a capacity (i.e., user capacity) of a corresponding VSSD is stored.

In the "over-provisioning" field, an over-provisioning capacity of a corresponding VSSD is stored.

In the "execution time of NAND processing" field, an upper limit value of process execution time of a corresponding VSSD is stored.

In the "amount of memory resources" field, an amount of memory resources of the DRAM 6 to be allocated to a corresponding VSSD is stored.

In the "total-write-amount-in-SSD" field, an upper limit value of a total amount of data capable of being written into a corresponding VSSD is stored.

In the "total amount of write-requested-data" field, an upper limit value of a total amount of data capable of being written into a corresponding VSSD by the host 2 is stored.

In the "host-side access bandwidth" field, a band width between a corresponding VSSD and the host 2 is stored.

Next, an operation for allocating the user capacity and the over-provisioning capacity to an individual VSSD, based on a request from the host 2 that designates a set of the user capacity and the over-provisioning capacity for each VSSD will be described, with reference to FIG. 9.

The VSSD creation unit 21 of the controller 4 allocates a capacity of the sum of the designated user capacity and the designated over-provisioning capacity to an individual VSSD based on a request from the host 2 that designates a set of the user capacity and the over-provisioning capacity for each VSSD.

In a case where the host 2 requests the SSD 3 to create a certain VSSD (here, VSSD #n), the host 2 designates the user capacity to be allocated for the VSSD #n and the over-provisioning capacity to be allocated for the VSSD #n. The VSSD creation unit 21 of the controller 4 allocates a capacity of the sum of the designated user capacity and the designated over-provisioning capacity to be used for the VSSD #n. As illustrated in FIG. 9, the sum of the allocated user capacity and the allocated over-provisioning capacity corresponds to a total capacity of the VSSD #n. As described above, performance and durability of the VSSD #n is gradually improved as the ratio of the over-provisioning capacity to the user capacity increases. The host 2 uses the parameter of capacity and the parameter of over-provisioning to request the SSD 3 to create a VSSD having performance and durability that meet of the requirements of a user.

The SSD 3 allocates the capacity of the sum of the user capacity designated by the parameter of capacity and the over-provisioning capacity designated by the parameter of over-provisioning to a VSSD so as to create a VSSD having performance and durability that meet the requirements of a user.

The host 2 may designate the number of physical blocks to be allocated to the VSSD #n as the over-provisioning capacity of the VSSD #n. In this case, the VSSD creation unit 21 may secure the designated number of physical blocks to be used for the VSSD #n and may also allocate a capacity corresponding to the number of the physical blocks to the VSSD #n as a total capacity. The remaining capacity obtained by deducting the user capacity from the total capacity corresponds to an over-provisioning capacity.

Figure 10:
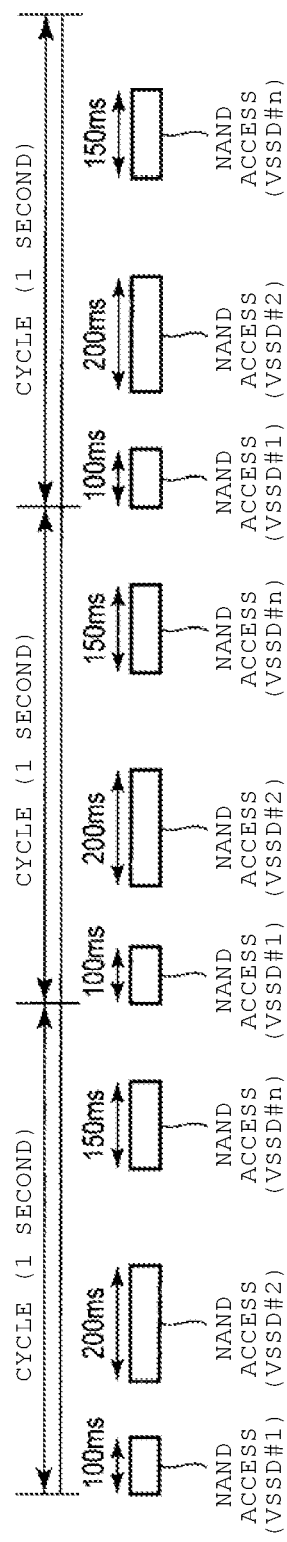
FIG. 10 illustrates a process for controlling an execution time of NAND processing executed by the memory system according to the embodiment.

FIG. 10 illustrates a process for controlling of execution time of NAND processing executed by the controller 4.

In the NAND flash memory 5, an erasure operation per block, a write operation per page, and a read operation per page are executed. The controller 4 of the SSD 3 controls a read operation and a write operation for the NAND flash memory 5 according to a read request (i.e., read command)/write request (i.e., write command) received from the host 2. The controller 4 controls the erasure operation, the read operation, and the write operation for the NAND flash memory 5 in order to execute garbage collection (GC) for the NAND flash memory 5.

In the present embodiment, a write operation (i.e., host-write-operation) to write data received from the host 2 to a write-destination block and a data copy operation for garbage collection are performed synchronously with each other. For example, when a certain set amount of data is copied, a host-write-operation of a certain set amount of data is permitted. When the write-destination block in which data from the host 2 are written are filled with data, an erasure operation for a certain free block is executed and the free block is allocated as a new write-destination block, in the SSD 3. Accordingly, the erasure operation, the write operation, and the read operation needed for the NAND flash memory 5 are respectively executed according to progress of execution of respective commands from the host 2.

The time for erasure required for an erasure operation for the NAND flash memory 5 is, for example, 2 ms. The time for reading required for a read operation for the NAND flash memory 5 is, for example, 100 μs. The time for writing required for a write operation for the NAND flash memory 5 is, for example, 1 ms.

The controller 4 manages an upper limit value of execution time of the erasure operation, the write operation, or the read operation for the NAND flash memory 5 per unit time, for each VSSD based on the execution time of NAND processing designated from the host 2 for each VSSD.

The upper limit value of the execution time of the erasure operation, the write operation, or the read operation for the NAND flash memory 5 per unit time means the time (i.e., execution time of NAND processing) during which a certain NAND flash memory chip occupation is permitted per unit time (for example, 1 second).

In FIG. 10, it is assumed that the execution time of NAND processing, which is designated by the host 2, for VSSD #1 is 100 ms, that the execution time of NAND processing, which is designated by the host 2, for VSSD #2 is 200 ms, and that the execution time of NAND processing, which is designated by the host 2, for VSSD #n is 150 ms.

Regarding the VSSD #1, an upper limit of a total execution time of the erasure operation, the write operation, or the read operation per 1 cycle (for example 1 second) is limited to 100 ms to the maximum. In this case, regarding the VSSD #1, for example, one erasure operation and 98 write operations per 1 cycle (e.g., 1 second) can be executed. Otherwise, for example, one erasure operation and 980 read operations per 1 cycle (e.g., 1 second) can be executed.

The execution-time-of-NAND-processing control unit 24 of the controller 4 controls execution of respective commands directed to the VSSD #1 from the host 2 so that the execution time for the erasure operation, the write operation or the read operation of the VSSD #1 per 1 cycle (e.g., 1 second) falls within a range of 100 ms. In other words, the execution-time-of-NAND-processing control unit 24 executes each commands of a predetermined number of commands in a command group directed to the VSSD #1 stored in a queue per 1 cycle, so that the execution time for the erasure operation, the write operation or the read operation of the VSSD #1 per 1 cycle (e.g., 1 second) falls within a range of 100 ms.

For example, the execution-time-of-NAND-processing to control unit 24 may distributes 100 tokens corresponding execution time of 100 ms to the VSSD #1 for each cycle. Each time one erasure operation for the VSSD #1 is executed, the number of tokens (for example, 20 tokens) corresponding to the time for erasure are recovered from the VSSD #1. Each time one read operation for the VSSD #1 is executed, the number of tokens (for example, 1 token) corresponding to the time for reading are recovered from the VSSD #1. Each time one write operation for the VSSD #1 is executed, the number of tokens (for example, 10 tokens) corresponding to the time for writing is recovered from the VSSD #1. When the remaining token for the VSSD #1 is not present, execution of the command directed to the VSSD #1 is stopped. At the start of the next cycle, the execution-time-of-NAND-processing control unit 24 redistributes 100 tokens corresponding to the execution time of 100 ms to the VSSD #1. According to this operation, it is possible to schedule execution timing of the command group directed to the VSSD #1 which is stored in the queue, so that the execution time of the erasure operation, the write operation, or the read operation for the VSSD #1 per 1 cycle (for example 1 second) falls within a range of 100 ms.

Regarding the VSSD #2, an upper limit of a total execution time of the erasure operation, the write operation, or the read operation per 1 cycle (for example 1 second) is limited to 200 ms to the maximum. The execution-time-of-NAND-processing control unit 24 of the controller 4 controls execution of respective commands directed to the VSSD #2 from the host 2 so that the execution time for the erasure operation, the write operation or the read operation of the VSSD #2 per 1 cycle (e.g., 1 second) falls within a range of 200 ms. In other words, the execution-time-of-NAND-processing control unit 24 executes each commands of a predetermined number of commands in a command group directed to the VSSD #2 stored in a queue per 1 cycle so that the execution time for the erasure operation, the write operation or the read operation of the VSSD #2 per 1 cycle (e.g., 1 second) falls within a range of 200 ms.

For example, the execution-time-of-NAND-processing control unit 24 may distribute 200 tokens corresponding execution time of 200 ms to the VSSD #2 for each cycle. Each time one erasure operation for the VSSD #2 is executed, the number of tokens (for example, 20 tokens) corresponding to the time for erasure are recovered from the VSSD #2. Each time one read operation for the VSSD #2 is executed, the number of tokens (for example, 1 token) corresponding to the time for reading are recovered from the VSSD #2. Each time one write operation for the VSSD #2 is executed, the number of tokens (for example, 10 tokens) corresponding to the time for writing are recovered from the VSSD #2. When the remaining token for the VSSD #2 is not present, execution of the command directed to the VSSD #2 is stopped. At the start of the next cycle, the execution-time-of-NAND-processing control unit 24 redistributes 200 tokens corresponding to the execution time of 200 ms to the VSSD #2. According to this operation, it is possible to execute the command group directed to the VSSD #2 which is stored in the queue, so that the execution time of the erasure operation, the write operation, or the read operation for the VSSD #2 per 1 cycle (for example 1 second) falls within a range of 200 ms.

Regarding the VSSD #n, an upper limit of a total execution time of the erasure operation, the write operation, or the read operation per 1 cycle (for example 1 second) is limited to 150 ms to the maximum. The execution-time-of-NAND-processing control unit 24 of the controller 4 controls execution of respective commands directed to the VSSD #n from the host 2 so that the execution time for the erasure operation, the write operation or the read operation of the VSSD #n per 1 cycle (e.g., 1 second) falls within a range of 150 ms. In other words, the execution-time-of-NAND-processing control unit 24 executes each commands of a predetermined number of commands in a command group directed to the VSSD #n stored in a queue per 1 cycle so that the execution time for the erasure operation, the write operation or the read operation of the VSSD #n per 1 cycle (e.g., 1 second) falls within a range of 150 ms.

For example, the execution-time-of-NAND-processing control unit 24 may distributes 150 tokens corresponding execution time of 150 ms to the VSSD #n for each cycle. Each time one erasure operation for the VSSD #n is executed, the number of tokens (for example, 20 tokens) corresponding to the time for erasure are recovered from the VSSD #n. Each time one read operation for the VSSD #2 is executed, the number of tokens (for example, 1 token) corresponding to the time for reading are recovered from the VSSD #n. Each time one write operation for the VSSD #n is executed, the number of tokens (for example, 10 tokens) corresponding to the time for writing is recovered from the VSSD #n. When the remaining token for the VSSD #n is not present, execution of the command directed to the VSSD #n is stopped. At the start of the next cycle, the execution-time-of-NAND-processing control unit 24 redistributes 150 tokens corresponding to the execution time of 150 ms to the VSSD #n. According to this operation, it is possible to execute the command group directed to the VSSD #n which is stored in the queue, so that the execution time of the erasure operation, the write operation, or the read operation for the VSSD #n per 1 cycle (for example 1 second) falls within a range of 150 ms.

The token distribution and recovery processing as described above may be carried out to control, with respect to each individual VSSD, the rate of acquiring commands from a plurality of command queues (e.g., command issuance queue) on the memory of the host 2. In this case, a plurality of command queues (e.g., command issuance queue) corresponding to a plurality of VSSDs is arranged on the memory of the host 2. The commands from the virtual machine #1 are placed on a command queue corresponding to the VSSD #1, the commands from the virtual machine #2 are placed on a command queue corresponding to the VSSD #2, and the commands from the virtual machine #n are placed on a command queue corresponding to the VSSD #n. In the token distribution and recovery processing, the number of tokens corresponding to the upper limit value of processing execution time which correspond to the respective VSSDs are distributed to the VSSDs. In the individual VSSD, the commands directed to the VSSD are acquired from the command queue on the memory of the host 2 and the commands are executed. The number of tokens in accordance with a length of execution time of a NAND operation (e.g., write operation, read operation, or erasure operation) which needs to be executed with execution of the command is recovered from the VSSD. When the remaining token is not present, acquisition and execution of the commands directed to the VSSD from the command queues on the memory of the host 2 are stopped. At the start of the next cycle, the number of tokens corresponding to the upper limit value of the processing execution time which corresponds to each VSSD is redistributed to the VSSD.

The host-side access-band-width control unit 25 may also execute respective commands directed to each VSSD so as to allow a band width with respect to each VSSD to be fallen in the designated host-side access band width by using the same specification as that of the token distribution and recovery processing as described above.

Figure 11:
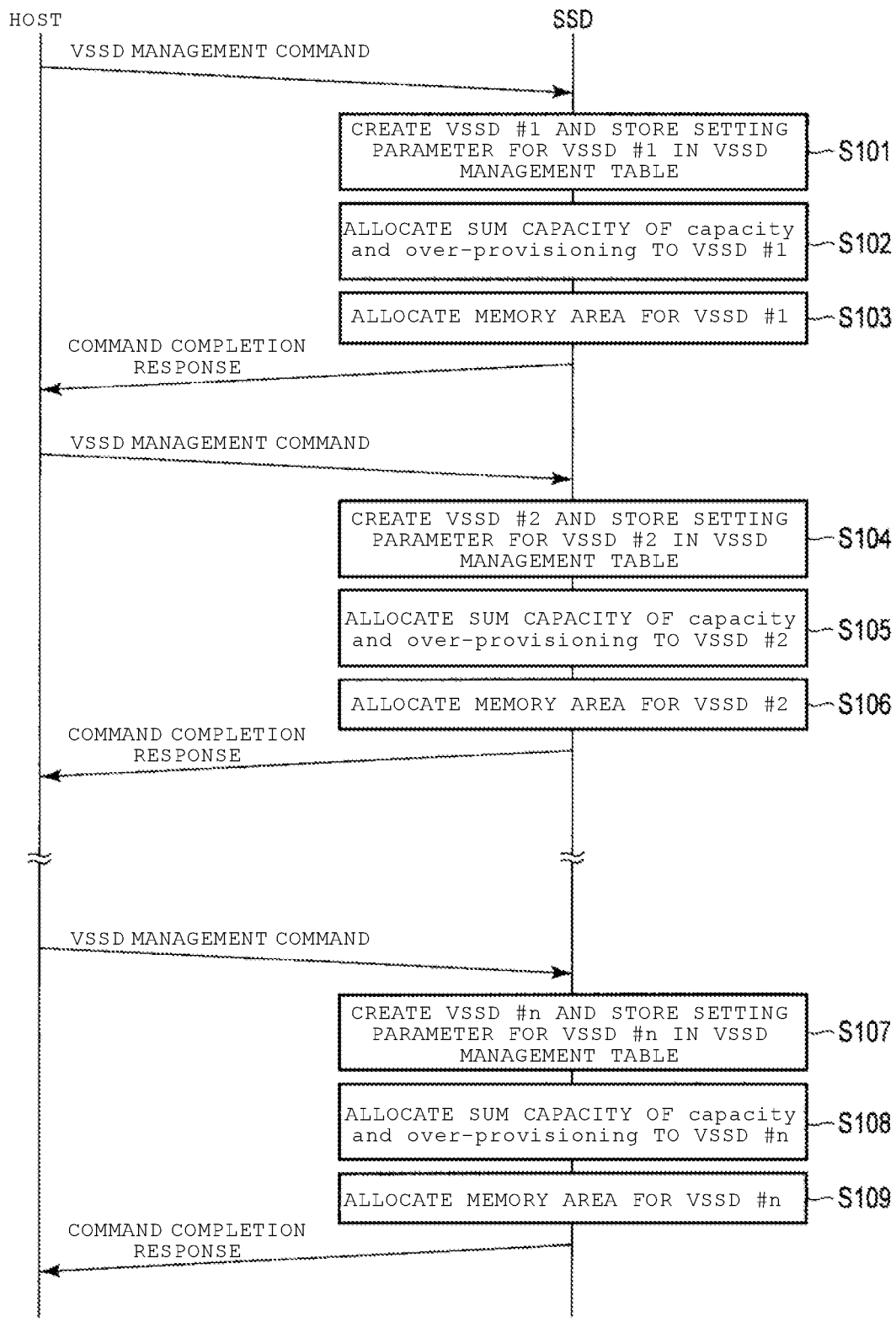
FIG. 11 is a sequence chart illustrating a sequence of storage area (VSSD) creation processing executed by the memory system according to the embodiment.

FIG. 11 is a sequence chart illustrating a sequence of VSSD creation processing.

The VSSD creation unit 21 creates the VSSD 51 (i.e., VSSD #1) based on the VSSD management command received first from the host 2 and stores a setting parameter, which is designated by the VSSD management command for the VSSD 51 (i.e., VSSD #1), in the VSSD management table 30 (Step S101).

Next, the VSSD creation unit 21 secures a capacity of the sum of the user capacity designated by the parameter of capacity and the over-provisioning capacity designated by the parameter of over-provisioning from the entire capacity of the NAND flash memory 5 with reference to the VSSD management table 30 and allocates the secured capacity to the VSSD 51 (i.e., VSSD #1) (Step S102). In Step S102, the VSSD creation unit 21 may secure (i.e., reserve) the number of physical blocks designated by the parameter of over-provisioning and allocate the number of secured (i.e., reserved) physical blocks to the VSSD 51 (i.e., VSSD #1).

Subsequently, the amount-of-memory-resource allocation unit 26 of the controller 4 secures a memory area (e.g., memory area 31 for VSSD #1) for storing management data to be used for the VSSD (i.e., VSSD #1) on the DRAM 6 with reference to the VSSD management table 30 and allocates the secured memory area (e.g., memory area 31 for VSSD #1) to the VSSD 51 (i.e., VSSD #1) (Step S103).

After processing in Steps S101 to Step S103 is completed, the controller 4 returns a response of command completion to the host 2. An ID of the VSSD #1 is included in the response of command completion. In the host 2, the virtual machine 41 transmits a command including the ID of the VSSD #1 to the SSD 3. The controller 4 executes access to the VSSD #1 in response to reception of the command including the ID of the VSSD #1.

The VSSD creation unit 21 creates the VSSD 52 (i.e., VSSD #2) based on the VSSD management command received second from the host 2 and stores a setting parameter for the VSSD 52 (i.e., VSSD #2) in the VSSD management table 30 (Step S104).

Next, the VSSD creation unit 21 secures a capacity of the sum of the user capacity designated by the parameter of capacity and the over-provisioning capacity designated by the parameter of over-provisioning from the entire capacity of the NAND flash memory 5 with reference to the VSSD management table 30 and allocates the secured capacity to the VSSD 52 (i.e., VSSD #2) (Step S105). In Step S105, the VSSD creation unit 21 may secure (i.e., reserve) the number of physical blocks designated by the parameter of over-provisioning and allocate the number of secured (i.e., reserved) physical blocks to the VSSD 52 (i.e., VSSD #2).

Subsequently, the amount-of-memory-resource allocation unit 26 secures a memory area (e.g., memory area 32 for VSSD #2) for storing management data to be used for the VSSD 52 (i.e., VSSD #2) on the DRAM 6 with reference to the VSSD management table 30 and allocates the secured memory area (e.g., memory area 32 for VSSD #2) to the VSSD 52 (i.e., VSSD #2) (Step S106).

After processing in Steps S104 to Step S106 is completed, the controller 4 returns a response of command completion to the host 2. An ID of the VSSD #2 is included in the response of command completion. In the host 2, the virtual machine 42 transmits a command including the ID of the VSSD #2 to the SSD 3. The controller 4 executes access to the VSSD #2 in response to reception of the command including the ID of the VSSD #2.

Similarly, the VSSD creation unit 21 creates a VSSD 57 (i.e., VSSD #n) based on the VSSD management command received from the host 2 in nth place and stores a setting parameter for the VSSD 57 (i.e., VSSD #n) in the VSSD management table 30 (Step S107).

Next, the VSSD creation unit 21 secures a capacity of the sum of the user capacity designated by the parameter of capacity and the over-provisioning capacity designated by the parameter of over-provisioning from among the entire capacity of the NAND flash memory 5 with reference to the VSSD management table 30 and allocates the secured capacity to the VSSD 57 (i.e., VSSD #n) (Step S108). In Step S108, the VSSD creation unit 21 may secure the number of physical blocks designated by the parameter of over-provisioning and allocate the number of secured physical blocks to the VSSD 57 (i.e., VSSD #n).

Subsequently, the amount-of-memory-resource allocation unit 26 secures a memory area (e.g., memory area 37 for VSSD #n) for storing management data to be used for the VSSD 57 (i.e., VSSD #n) on the DRAM 6 with reference to the VSSD management table 30 and allocates the secured memory area (e.g., memory area 37 for VSSD #n) to the VSSD 57 (i.e., VSSD #n) (Step S109).

After processing in Steps S107 to Step S109 is completed, the controller 4 returns a response of command completion to the host 2. An ID of the VSSD #n is included in the response of command completion. In the host 2, the virtual machine 47 transmits a command including the ID of the VSSD #n to the SSD 3. The controller 4 executes access to the VSSD #n in response to reception of the command including the ID of the VSSD #n.

Figure 12:
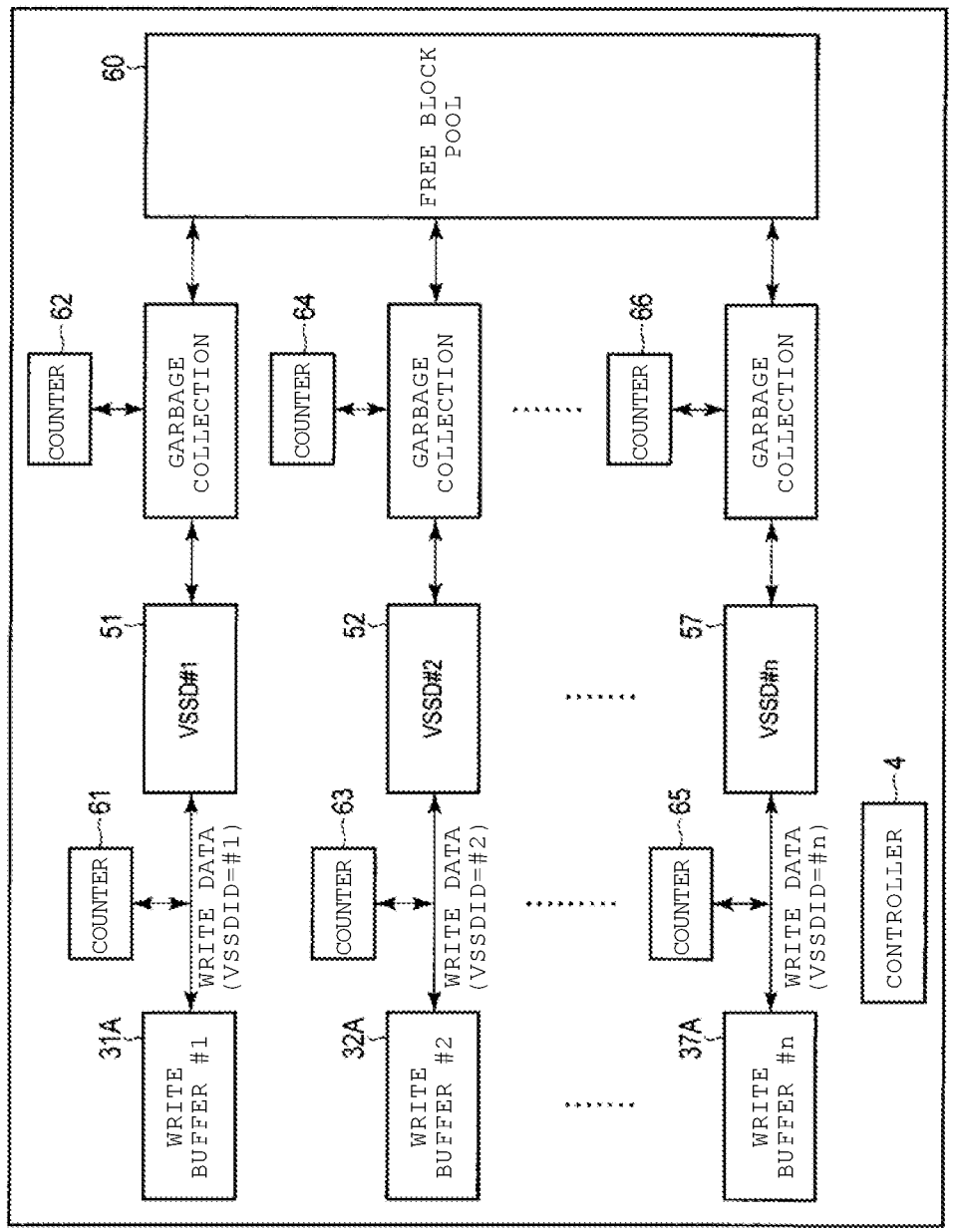
FIG. 12 is a block diagram for explaining write-data-amount count processing executed by the memory system according to the embodiment.

Next, the write-data-amount count processing executed by the controller 4 will be described with reference to FIG. 12.

The controller 4 includes two kinds of counters of a counter for counting an amount of data written by the host 2 and a counter for counting an amount of data written through the operation of garbage collection, for each VSSD.

Write data directed to VSSD 51 (i.e., VSSD #1) from the host 2 is written into the write buffer 31A. The counter 61 counts an amount of data written into the VSSD 51 (i.e., VSSD #1) from the write buffer 31A. The counter 62 counts a total amount of data written into the VSSD 51 (i.e., VSSD #1) through garbage collection for the VSSD 51 (i.e., VSSD #1). A free block generated through garbage collection for the VSSD 51 (i.e., VSSD #1) may be placed on the free block pool 60 which is shared among the VSSDs.

Write data directed to VSSD 52 (i.e., VSSD #2) from the host 2 are written into the write buffer 32A. The counter 63 counts an amount of data written into the VSSD 52 (i.e., VSSD #2) from the write buffer 32A. The counter 64 counts a total amount of data written into the VSSD 52 (i.e., VSSD #2) through garbage collection for the VSSD 52 (i.e., VSSD #2). A free block generated through garbage collection for the VSSD 52 (i.e., VSSD #2) may be placed on the free block pool 60 which is shared among the VSSDs.

Write data directed to VSSD 57 (i.e., VSSD #n) from the host 2 is written into the write buffer 37A. The counter 65 counts an amount of data written into the VSSD 57 (i.e., VSSD #n) from the write buffer 37A. The counter 66 counts a total amount of data written into the VSSD 57 (i.e., VSSD #n) by garbage collection for the VSSD 57 (i.e., VSSD #n). A free block generated by garbage collection for the VSSD 57 (i.e., VSSD #n) may be placed on the free block pool 60 which is shared among the VSSDs.

Figure 13:
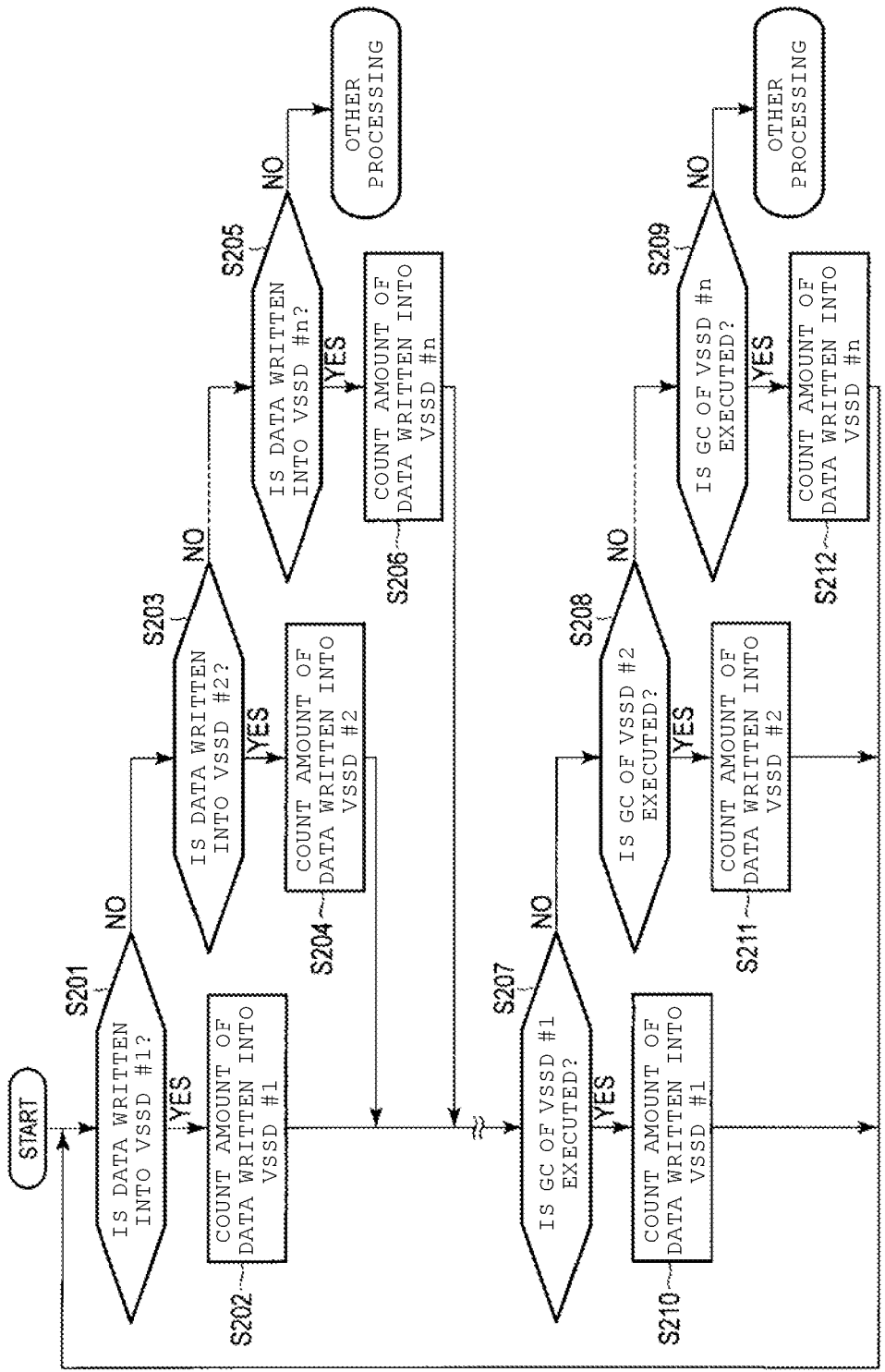
FIG. 13 is a flowchart illustrating a procedure of the write-data-amount count processing executed by the memory system according to the embodiment.

The flowchart of FIG. 13 illustrates a procedure of the write-data-amount count processing executed by the controller 4.

When the controller 4 of the SSD 3 receives a write command from the host 2, the controller 4 determines a target VSSD to which write data are to be written based on a VSSD ID included in the write command. The controller 4 writes the write data into the target VSSD (Step S201, Step S203, and Step S205) and counts an amount of written data (Step S202, Step S204, and Step S206).

In a case where writing of data into the VSSD 51 (i.e., VSSD #1) is performed (YES in Step S201), the controller 4 writes data into the VSSD 51 (i.e., VSSD #1) and counts the amount of data written into the VSSD 51 (i.e., VSSD #1) using the counter 61 (Step S202).

In a case where writing of data into the VSSD 52 (i.e., VSSD #2) is performed (YES in Step S203), the controller 4 writes data into the VSSD 52 (i.e., VSSD #2) and counts the amount of data written into the VSSD 52 (i.e., VSSD #2) using the counter 63 (Step S204).

In a case where writing of data into the VSSD 57 (i.e., VSSD #n) is performed (YES in Step S205), the controller 4 writes data into the VSSD 57 (i.e., VSSD #n) and counts the amount of data written into the VSSD 57 (i.e., VSSD #n) using the counter 65 (Step S206).

When garbage collection is executed, the controller 4 counts the amount of data written through the garbage collection, for each VSSD.

In a case where garbage collection for the VSSD 51 (i.e., VSSD #1) is executed (YES in Step S207), the controller 4 counts the amount of data which are written into the VSSD 51 (i.e., VSSD #1) through the garbage collection, using the counter 62 (Step S210).

In a case where garbage collection for the VSSD 52 (i.e., VSSD #2) is executed (YES in Step S208), the controller 4 counts the amount of data which are written into the VSSD 52 (i.e., VSSD #2) through the garbage collection, using the counter 64 (Step S211).

In a case where garbage collection operation for the VSSD 57 (i.e., VSSD #n) is executed (YES in Step S209), the controller 4 counts the amount of data which are written into the VSSD 57 (i.e., VSSD #n) through the garbage collection, using the counter 66 (Step S212).

Figure 14:
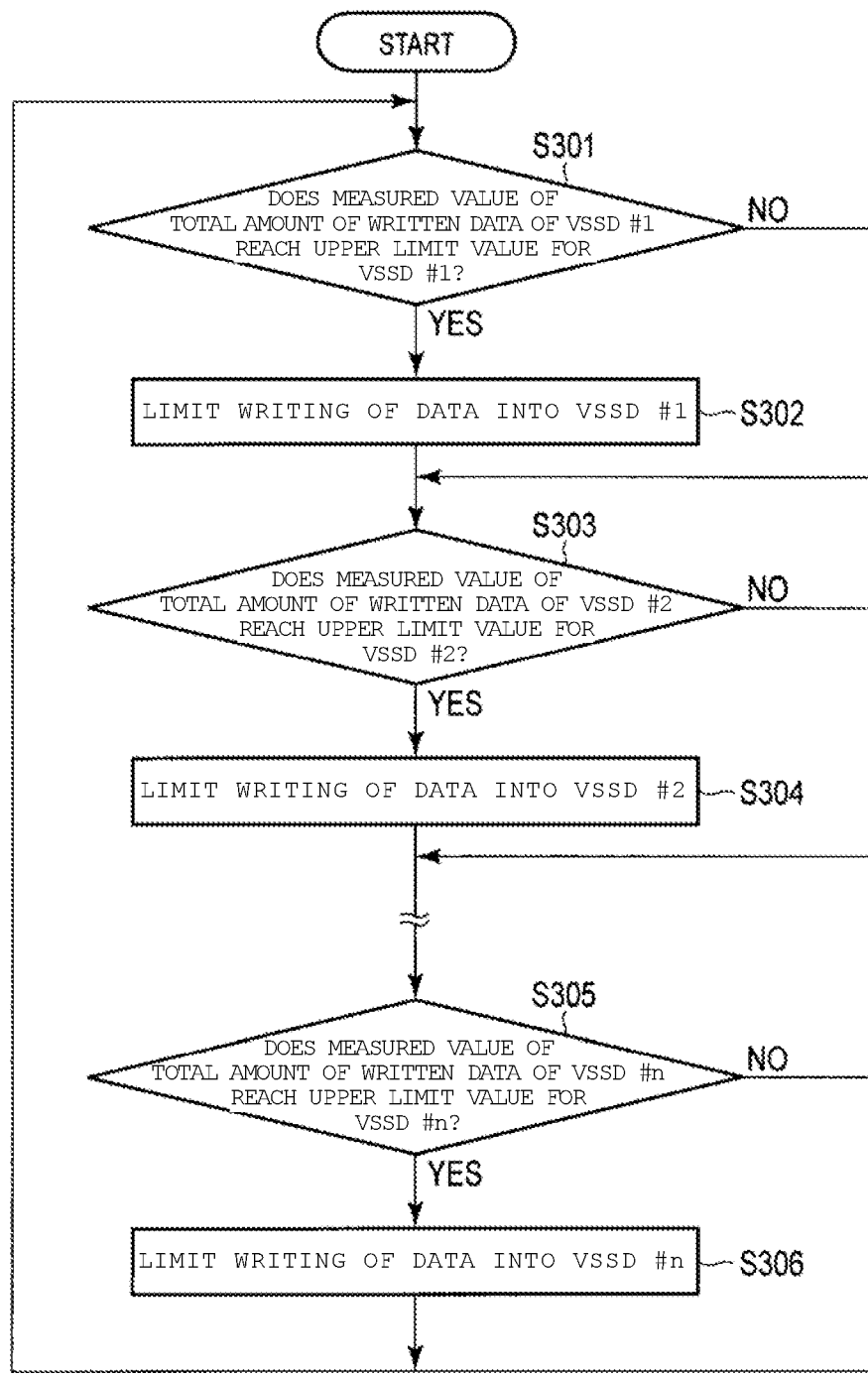
FIG. 14 is a flowchart illustrating a procedure of a process for limiting a total amount of data written into the individual storage area (VSSD) executed by the memory system according to the embodiment.

The flowchart of FIG. 14 illustrates a procedure of a process for limiting a total amount of data written (i.e., total write amount) in the individual VSSD, executed by the controller 4.

The write limitation unit 23 of the controller 4 determines whether or not a measured value of a total write amount of the VSSD 51 (i.e., VSSD #1) reaches an upper limit value of the total write amount for the VSSD 51 (i.e., VSSD #1) (Step S301). In a case where the measured value of the total write amount of the VSSD 51 (i.e., VSSD #1) reaches the upper limit value of the total write amount for the VSSD 51 (i.e., VSSD #1) (YES in Step S301), the write limitation unit 23 limits writing of data into the VSSD 51 from the host 2 (Step S302). In Step S302, the write limitation unit 23 may prohibit writing of data into the VSSD 51 (i.e., VSSD #1) from the host 2 or reduce performance of writing of data into the VSSD 51 (i.e., VSSD #1) from the host 2.

The write limitation unit 23 determines whether or not a measured value of a total write amount of the VSSD 52 (i.e., VSSD #2) reaches an upper limit value of the total write amount for the VSSD 52 (i.e., VSSD #2) (Step S303). In a case where the measured value of the total write amount of the VSSD 52 (i.e., VSSD #2) reaches the upper limit value of the total write amount for the VSSD 52 (i.e., VSSD #2) (YES in Step S303), the write limitation unit 23 limits writing of data into the VSSD 52 (i.e., VSSD #2) from the host 2 (Step S304). In Step S304, the write limitation unit 23 may prohibit writing of data into the VSSD 52 (i.e., VSSD #2) from the host 2 or reduce performance of writing of data into the VSSD 52 (i.e., VSSD #2) from the host 2.

The write limitation unit 23 determines whether or not a measured value of a total write amount of the VSSD 57 (i.e., VSSD #n) reaches an upper limit value of the total write amount for the VSSD 57 (i.e., VSSD #n) (Step S305). In a case where the measured value of the total write amount of the VSSD 57 (i.e., VSSD #n) reaches the upper limit value of the total write amount for the VSSD 57 (i.e., VSSD #n) (YES in Step S305), the write limitation unit 23 limits writing of data into the VSSD 57 (i.e., VSSD #n) from the host 2 (Step S306). In Step S306, the write limitation unit 23 may prohibit writing of data into the VSSD 57 (i.e., VSSD #n) from the host 2 or reduce performance of writing of data into the VSSD 57 (i.e., VSSD #n) from the host 2.

Figure 15:
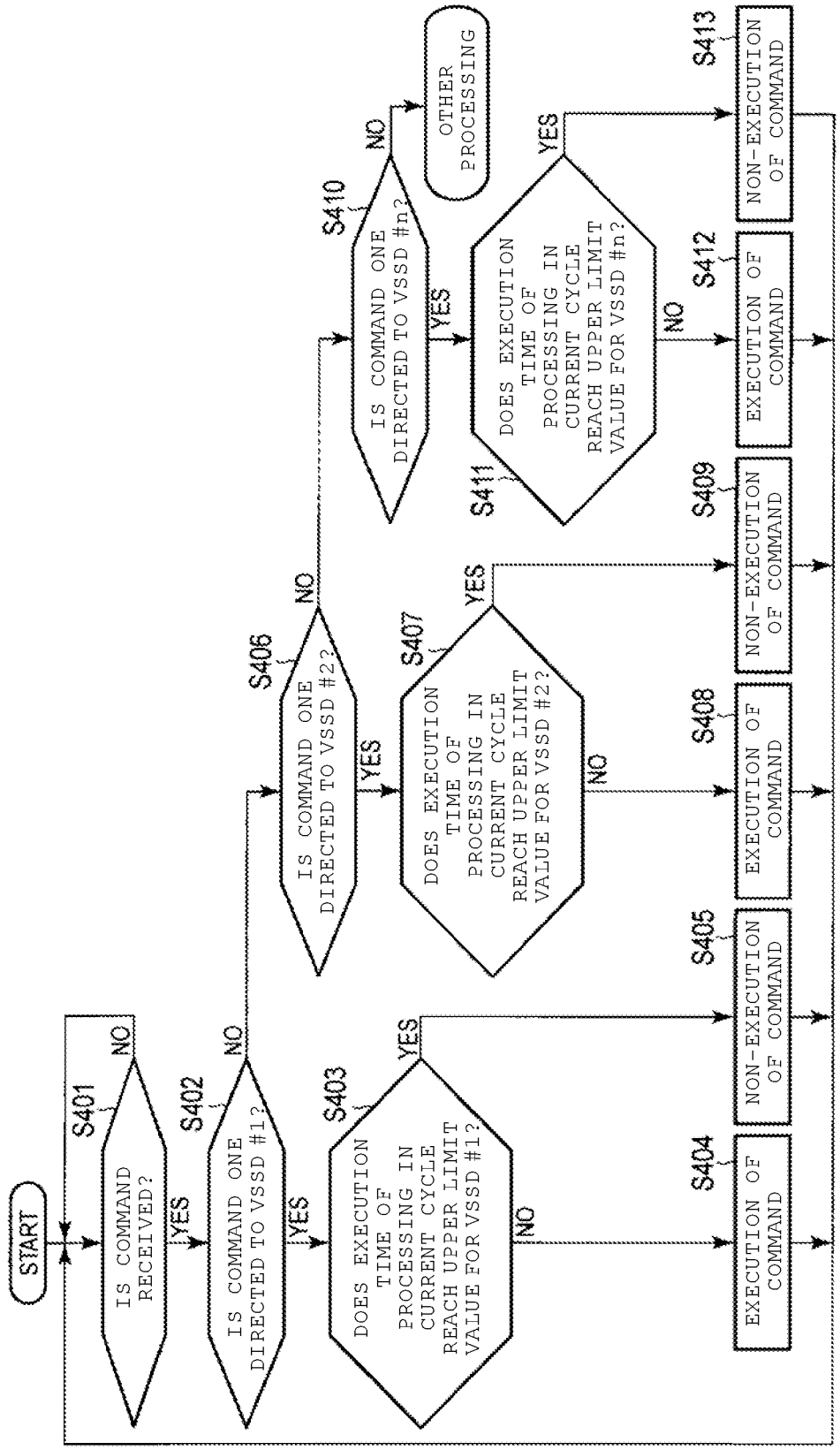
FIG. 15 is a flowchart illustrating a procedure of a process for controlling the execution time of NAND processing executed by the memory system according to the embodiment.

The flowchart of FIG. 15 illustrates a procedure of a process for controlling execution time of NAND processing executed by the controller 4.

In a case where the controller 4 receives a command from the host 2 (YES in Step S401), the controller 4 determines a target VSSD for which the command is to be executed based on a VSSD ID included in the command (Step S402, Step S406, Step S410).

In a case where the target VSSD is the VSSD 51 (i.e., VSSD #1), that is, in a case where the received command is the command directed to the VSSD 51 (i.e., VSSD #1) (YES in Step S402), the controller 4 determines whether or not a total of execution time of processing of the VSSD 51 (i.e., VSSD #1) in the current cycle reaches an upper limit value of execution time of processing for the VSSD 51 (i.e., VSSD #1) (Step S403). The total of execution time of processing of the VSSD 51 (i.e., VSSD #1) in the current cycle indicates a total time used for an erasure operation, a write operation or a read operation for the VSSD #1 in the current cycle. The upper limit value of execution time of processing for the VSSD 51 (i.e., VSSD #1) indicates the "execution time of NAND processing" for the VSSD #1 designated by the VSSD management command.

In a case where the total of execution time of processing of the VSSD 51 (i.e., VSSD #1) in the current cycle does not reach the upper limit value of execution time of processing for the VSSD (i.e., VSSD #1) (NO in Step S403), the controller 4 executes the command directed to the received VSSD 51 (i.e., VSSD #1) (Step S404). On the other hand, in a case where the total of execution time of processing of the VSSD 51 (i.e., VSSD #1) in the current cycle reaches the upper limit value of execution time of processing for the VSSD 51 (i.e., VSSD #1) (YES in Step S404), the controller 4 does not execute the command directed to the received VSSD 51 (i.e., VSSD #1) (Step S405) and executes the command while waiting until the next cycle.

Processing in Steps S403 to S405 may be realized by, for example, the token distribution and recovery as described above. In this case, the controller 4 allocates the number of tokens corresponding to the upper limit value execution time of processing for the VSSD #1 to be used for the VSSD #1. Each time the command directed to the VSSD #1 from the host 2 (e.g., virtual machine #1) is executed, the number of tokens corresponding to the kind of the command is recovered from the VSSD #1. When the remaining token for the VSSD #1 is not present or the number of tokens is reduced to be less than or equal to a certain number, the controller 4 determines that the total of execution time of processing of the VSSD #1 in the current cycle reaches the upper limit value of execution time of processing for the VSSD #1.

In a case where the target VSSD is the VSSD 52 (i.e., VSSD #2), that is, in a case where the received command is the command directed to the VSSD 52 (i.e., VSSD #2) (YES in Step S406), the controller 4 determines whether or not a total of execution time of processing of the VSSD 52 (i.e., VSSD #2) in the current cycle reaches an upper limit value of execution time of processing for the VSSD 52 (i.e., VSSD #2) (Step S407). The total of execution time of processing of the VSSD 52 (i.e., VSSD #2) in the current cycle indicates a total time used for an erasure operation, a write operation or a read operation for the VSSD #2 in the current cycle. The upper limit value of execution time of processing for the VSSD 52 (i.e., VSSD #2) indicates the "execution time of NAND processing" for the VSSD #2 designated by the VSSD management command.

In a case where the total of execution time of processing of the VSSD 52 (i.e., VSSD #2) in the current cycle does not reach the upper limit value of execution time of processing for the VSSD (i.e., VSSD #2) (NO in Step S407), the controller 4 executes the command directed to the received VSSD 52 (i.e., VSSD #2) (Step S408). On the other hand, in a case where the total of execution time of processing of the VSSD 52 (i.e., VSSD #2) in the current cycle reaches the upper limit value of execution time of processing for the VSSD 52 (i.e., VSSD #2) (YES in Step S407), the controller 4 does not execute the command directed to the received VSSD 52 (i.e., VSSD #2) (Step S409) and executes the command while waiting until the next cycle.

Processing in Steps S407 to S409 may be realized by, for example, the token distribution and recovery as described above. In this case, the controller 4 allocates the number of tokens corresponding to the upper limit value execution time of processing for the VSSD #2 to be used for the VSSD #2. Each time the command directed to the VSSD #2 from the host 2 (i.e., virtual machine #2) is executed, the number of tokens corresponding to the kind of the command is recovered from the VSSD #2. When the remaining token for the VSSD #2 is not present or the number of tokens is reduced to be less than or equal to a certain number, the controller 4 determines that the total of execution time of processing of the VSSD #2 in the current cycle reaches the upper limit value of execution time of processing for the VSSD #2.

In a case where the target VSSD is the VSSD 57 (i.e., VSSD #n), that is, in a case where the received command is the command directed to the VSSD 57 (i.e., VSSD #n) (YES in Step S410), the controller 4 determines whether or not a total of execution time of processing of the VSSD 57 (i.e., VSSD #n) in the current cycle reaches an upper limit value of execution time of processing for the VSSD 57 (i.e., VSSD #n) (Step S411). The total of execution time of processing of the VSSD 57 (i.e., VSSD #n) in the current cycle indicates total time used for an erasure operation, a write operation or a read operation for the VSSD #n in the current cycle. The upper limit value of execution time of processing for the VSSD 57 (i.e., VSSD #n) indicates the "execution time of NAND processing" for the VSSD #n designated by the VSSD management command.

In a case where the total of execution time of processing of the VSSD 57 (i.e., VSSD #n) in the current cycle does not reach the upper limit value of execution time of processing for the VSSD (i.e., VSSD #n) (NO in Step S411), the controller 4 executes the command directed to the received VSSD 57 (i.e., VSSD #n) (Step S412). On the other hand, in a case where the total of execution time of processing of the VSSD 57 (i.e., VSSD #n) in the current cycle reaches the upper limit value of execution time of processing for the VSSD 57 (i.e., VSSD #n) (YES in Step S411), the controller 4 does not execute the command directed to the received VSSD 57 (i.e., VSSD #n) (Step S413) and executes the command while waiting until the next cycle.

Processing in Steps S411 to S413 may be realized by, for example, the token distribution and recovery as described above. In this case, the controller 4 allocates the number of tokens corresponding to the upper limit value execution time of processing for the VSSD #n to be used for the VSSD #n. Each time the command directed to VSSD #n from the host 2 (e.g., virtual machine #n) is executed, the number of tokens corresponding to the kind of the command is recovered from the VSSD #n. When the remaining token for the VSSD #n is not present or the number of tokens is reduced to be less than or equal to a certain number, the controller 4 determines that the total of execution time of processing of the VSSD #n in the current cycle reaches the upper limit value of execution time of processing for the VSSD #n.

Next, an example of the token distribution and recovery processing as described above will be described with reference to FIG. 16 and FIG. 17.

In the token distribution and recovery processing, the number of tokens corresponding to the upper limit value of processing execution time which correspond to respective VSSDs are distributed to the VSSDs. In the individual VSSD, each time the command directed to the VSSD is executed, the number of tokens in accordance with a length of execution time of a NAND operation (e.g., write operation, read operation, or erasure operation) which needs to be executed with execution of the command is recovered from the VSSD. When the remaining token is not present, execution of the commands directed to the VSSD is stopped. At the start of the next cycle, the number of tokens corresponding to the upper limit value of the processing execution time which corresponds to each VSSD is redistributed to the VSSD.

Figure 16:
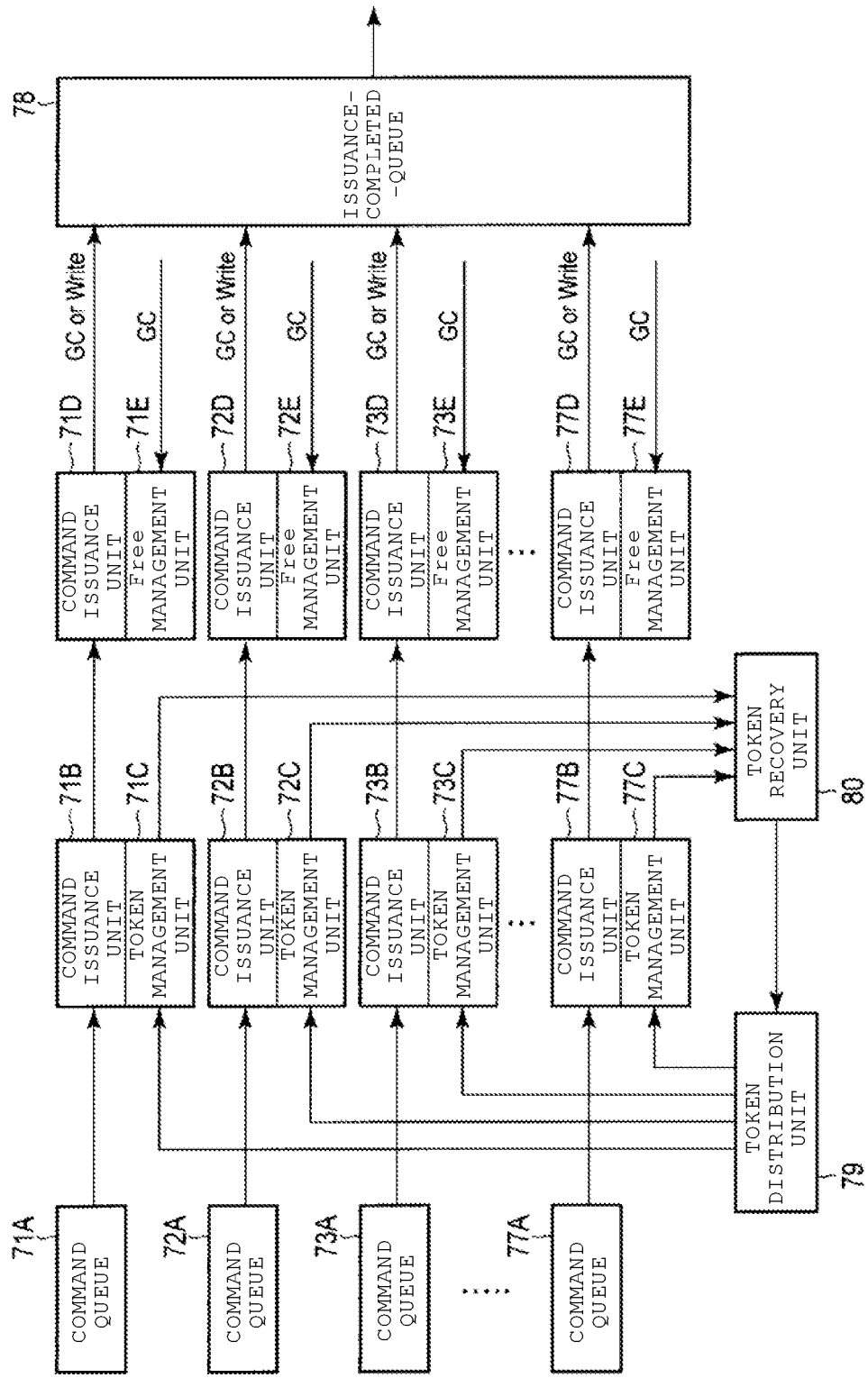
FIG. 16 is a block diagram illustrating an example of token distribution and recovery processing executed by the memory system according to the embodiment.
Figure 17:
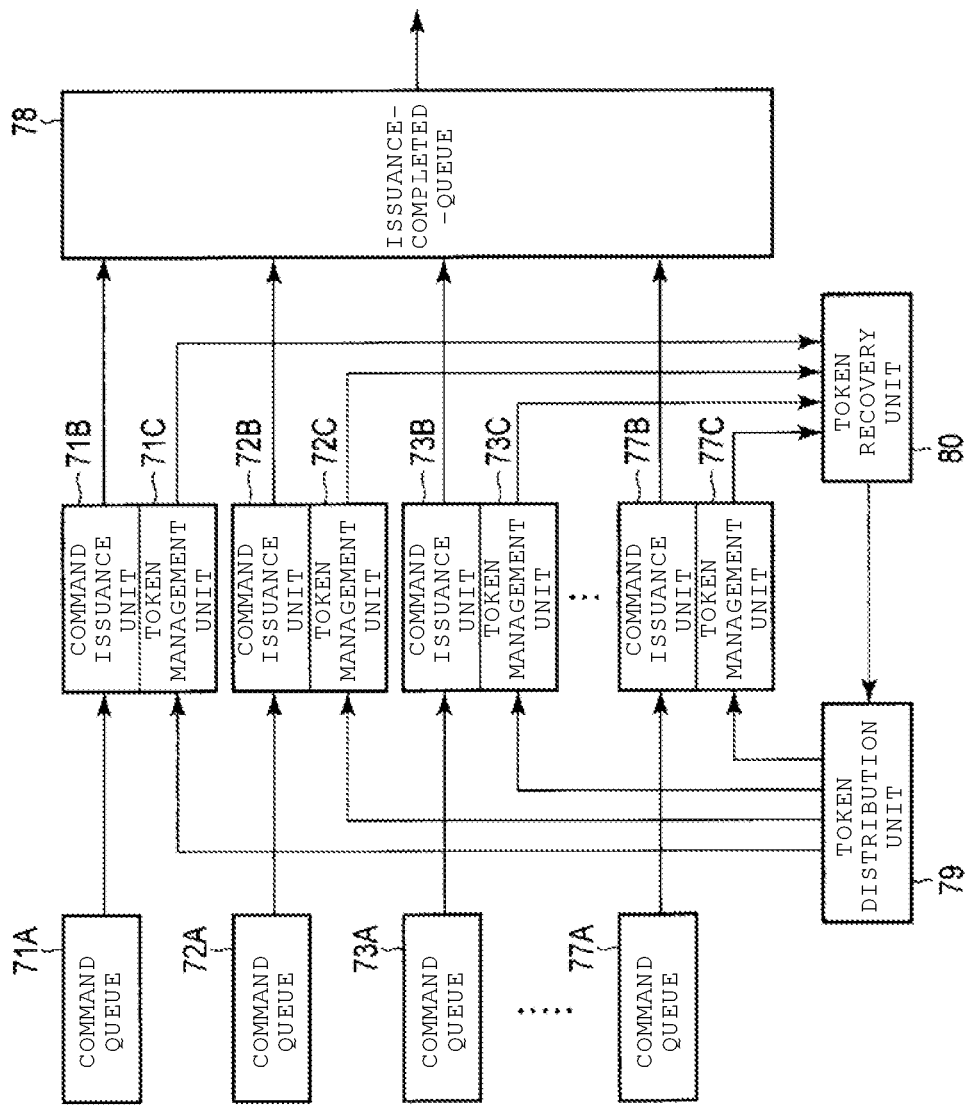
FIG. 17 is a block diagram illustrating another example of the token distribution and recovery processing executed by the memory system according to the embodiment.

In the examples of processing of FIG. 16 and FIG. 17, a case in which tokens for a write command and tokens for a read command are independent from each other is assumed. The tokens for write command may be shared with tokens for the GC.

FIG. 16 illustrates an example of token distribution and recovery processing for executing a write command (i.e., host-write-operation) or a GC command (i.e., write operation for copying data or erasure operation).

Respective commands directed to VSSD 51 (i.e., VSSD #1) from the host 2 may be stored in a command queue 71A for the VSSD #1. Respective commands directed to VSSD 52 (i.e., VSSD #2) from the host 2 may be stored in a command queue 72A for the VSSD #2. Respective commands directed to VSSD 53 (i.e., VSSD #3) from the host 2 may be stored in a command queue 73A for the VSSD #3. Similarly, respective commands directed to VSSD 57 (i.e., VSSD #n) from the host 2 may be stored in a command queue 77A for the VSSD #n.

As described above, the number of tokens corresponding to execution time of processing for the VSSD is distributed in each VSSD. The token distribution unit 79 of the controller 4 distributes the number of tokens corresponding to the upper limit value of the execution time of processing for the VSSD #1 to a token management unit 71C for the VSSD #1. Similarly, the token distribution unit 79 distributes the number of tokens corresponding to the upper limit value of the execution time of processing for the VSSD #2 to a token management unit 72C for the VSSD #2, distributes the number of tokens corresponding to the upper limit value of the execution time of processing for the VSSD #3 to a token management unit 73C for the VSSD #3, and distributes the number of tokens corresponding to the upper limit value of the execution time of processing for the VSSD #n to a token management unit 77C for the VSSD #n.

In a case where the token management unit 71C for the VSSD #1 has the number of tokens needed for execution of write (or GC), the token management unit 71C may permit a command issuance unit 71B for the VSSD #1 to issue a write command or a GC command. Each time issuance of the write command or the GC command is permitted, a token recovery unit 80 of the controller 4 may recover the number of tokens needed for execution of write (or GC) from the token management unit 71C. When the token is not present in the token management unit 71C, issuance of a command for the VSSD #1 is prohibited.

In a case where issuance of a write command or a GC command for the VSSD #1 is permitted, a command issuance unit 71D for the VSSD #1 may determine which one of the write command or the GC command is to be issued, or may issue any of the write command or the GC command based on, for example, the number of free blocks, at present, for VSSD #1 managed by a free management unit 71E. With this, the write operation, the erasure operation, or the like for the VSSD #1 is executed. The issued command may be input to an issuance-completed-queue 78.

In a case where the token management unit 72C for the VSSD #2 has the number of tokens needed for execution of write (or GC), the token management unit 72C may permit a command issuance unit 72B for the VSSD #2 to issue a write command or a GC command. Each time issuance of the write command or the GC command is permitted, the token recovery unit 80 of the controller 4 may recover the number of tokens needed for execution of write (or GC) from the token management unit 72C. When the token is not present in the token management unit 72C, issuance of a command for the VSSD #2 is prohibited.

In a case where issuance of a write command or a GC command for the VSSD #2 is permitted, a command issuance unit 72D for the VSSD #2 may determine which one of the write command or the GC command is to be issued, or may issue any of the write command or the GC command based on, for example, the number of free blocks, at present, for VSSD #2 managed by a free management unit 72E. With this, the write operation, the erasure operation, or the like for the VSSD #2 is executed. The issued command may be input to an issuance-completed-queue 78.

In a case where the token management unit 73C for the VSSD #3 has the number of tokens needed for execution of write (or GC), the token management unit 73C may permit a command issuance unit 73B for the VSSD #3 to issue a write command or a GC command. Each time issuance of the write command or the GC command is permitted, the token recovery unit 80 of the controller 4 may recover the number of tokens needed for execution of write (or GC) from the token management unit 73C. When the token is not present in the token management unit 73C, issuance of a command for the VSSD #3 is prohibited.

In a case where issuance of a write command or a GC command for the VSSD #3 is permitted, a command issuance unit 73D for the VSSD #3 may determine which one of the write command or the GC command is to be issued, or may issue any of the write command or the GC command based on, for example, the number of free blocks, at present, for VSSD #3 managed by a free management unit 73E. With this, the write operation, the erasure operation, or the like for the VSSD #3 is executed. The issued command may be input to an issuance-completed-queue 78.

In a case where the token management unit 77C for the VSSD #n has the number of tokens needed for execution of write (or GC), the token management unit 77C may permit a command issuance unit 77B for the VSSD #n to issue a write command or a GC command. Each time issuance of the write command or the GC command is permitted, the token recovery unit 80 of the controller 4 may recover the number of tokens needed for execution of write (or GC) from the token management unit 77C. When the token is not present in the token management unit 77C, issuance of a command for the VSSD #n is prohibited.

In a case where issuance of a write command or a GC command for the VSSD #n is permitted, a command issuance unit 77D for the VSSD #n may determine which one of the write command or the GC command is to be issued, or may issue any of the write command or the GC command based on, for example, the number of free blocks, at present, for VSSD #n managed by a free management unit 77E. With this, the write operation, the erasure operation, or the like for the VSSD #n is executed. The issued command may be input to an issuance-completed-queue 78.

FIG. 17 illustrates an example of the token distribution and recovery processing for executing a read command.

In a case where the token management unit 71C for the VSSD #1 has the number of tokens needed for execution of read, the token management unit 71C may permit the command issuance unit 71B for the VSSD #1 to issue a read command. Each time issuance of the read command is permitted, the token recovery unit 80 of the controller 4 may recover the number of tokens needed for execution of read from the token management unit 71C. When the token is not present in the token management unit 71C, issuance of a command for the VSSD #1 is prohibited.

In a case where the token management unit 72C for the VSSD #2 has the number of tokens needed for execution of read, the token management unit 72C may permit the command issuance unit 72B for the VSSD #2 to issue a read command. Each time issuance of the read command is permitted, the token recovery unit 80 of the controller 4 may recover the number of tokens needed for execution of read from the token management unit 72C. When the token is not present in the token management unit 72C, issuance of a command for the VSSD #2 is prohibited.

In a case where the token management unit 73C for the VSSD #3 has the number of tokens needed for execution of read, the token management unit 73C may permit the command issuance unit 73B for the VSSD #3 to issue a read command. Each time issuance of the read command is permitted, the token recovery unit 80 of the controller 4 may recover the number of tokens needed for execution of read from the token management unit 73C. When the token is not present in the token management unit 73C, issuance of a command for the VSSD #3 is prohibited.

In a case where the token management unit 77C for the VSSD #n has the number of tokens needed for execution of read, the token management unit 77C may permit the command issuance unit 77B for the VSSD #n to issue a read command. Each time issuance of the read command is permitted, the token recovery unit 80 of the controller 4 may recover the number of tokens needed for execution of read from the token management unit 77C. When the token is not present in the token management unit 77C, issuance of a command for the VSSD #n is prohibited.

Figure 18:
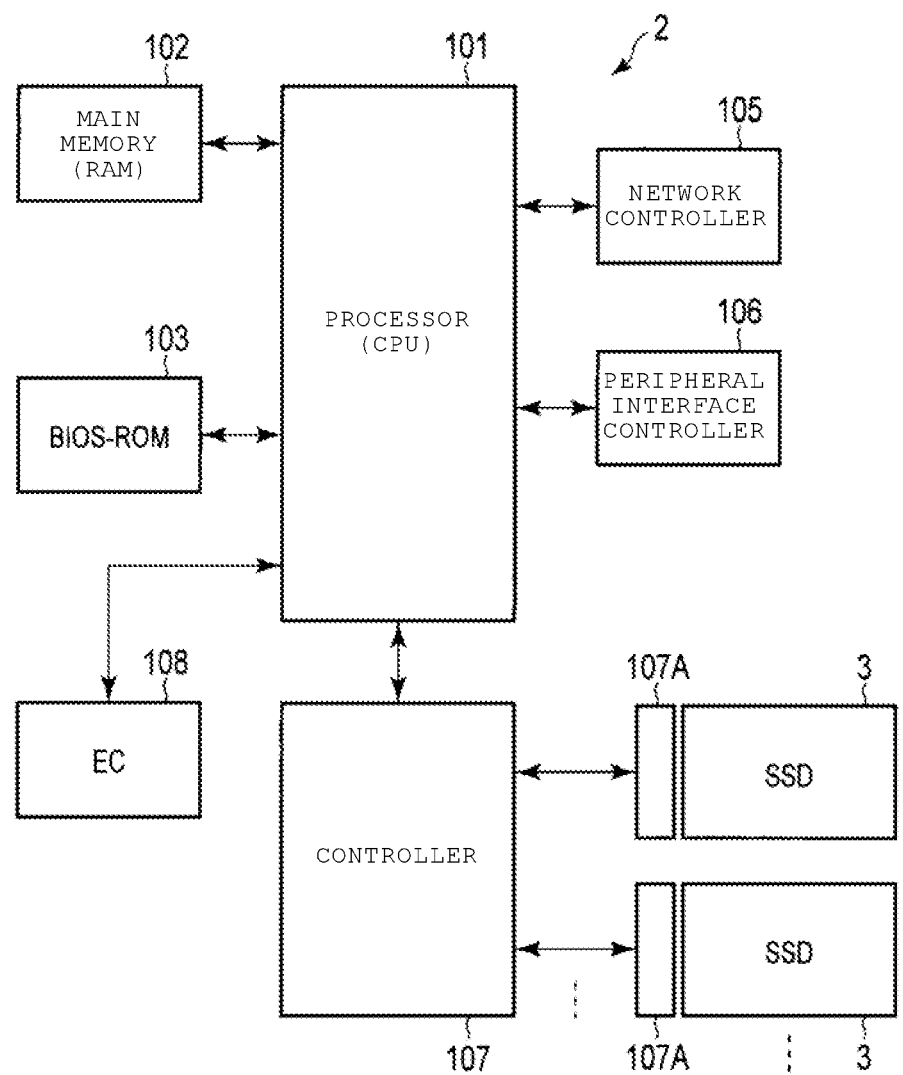
FIG. 18 is a block diagram of a host.

FIG. 18 illustrates an example of a hardware configuration of an information processing device (e.g., computing device) which functions as the host 2.

The information processing device is realized as a computing device such as a server. The information processing device includes a processor (e.g., CPU) 101, a main memory 102, a BIOS-ROM 103, a network controller 105, a peripheral interface controller 106, a controller 107, an embedded controller (EC) 108 and the like.

The processor 101 is a CPU configured to control operations of respective components of the information processing device. The processor 101 executes various programs loaded to the main memory 102 from any one of the plurality of SSDs 3. The main memory 102 is configured with a random access memory such as a DRAM. The program executed by the processor 101 includes the virtual machine, the device driver and the like as described above. The program may include a setting program for setting a capacity, performance, and availability of each VSSD by issuing a VSSD management command as described above. The setting program requests the SSD 3 to create a VSSD that matches the storage requirements of an individual user (e.g., end user).

The processor 101 also executes a basic input and output system (BIOS) stored in the BIOS-ROM 103 which is a nonvolatile memory. The BIOS is a system program for hardware control.

The network controller 105 is a communication device such as a wired LAN controller or a wireless LAN controller. The peripheral interface controller 106 is configured to execute communication with a peripheral device such as a USB device.

The controller 107 is configured to execute communication with devices connected respectively to a plurality of connectors 107A. The plurality of SSDs 3 may be connected to the plurality of connectors 107A, respectively. The controller 107 may include, for example, a SAS expander, a PCIe Switch, a PCIe expander, a flash array controller and a RAID controller.

The EC 108 functions as a system controller which is configured to execute power management of the information processing device.

Figure 19:
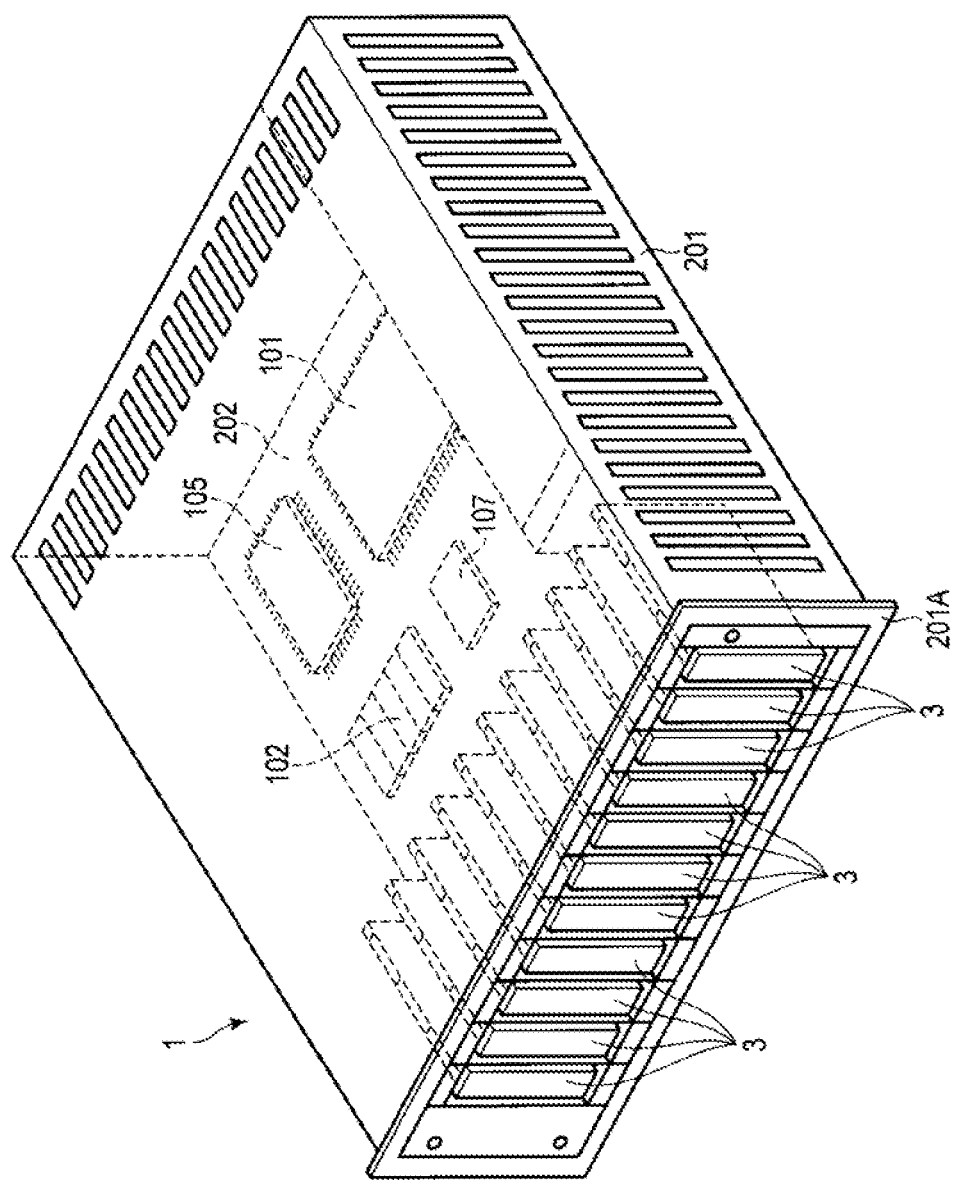
FIG. 19 is a transparent view of a computer including the memory system and the host according to the embodiment.

FIG. 19 illustrates an example of a configuration of an information processing device including a plurality of SSDs 3 and the host 2.

The information processing device includes a thin box-shaped casing 201 capable of being accommodated in a rack. A plurality of SSDs 3 may be arranged inside the casing 201. In this case, each SSD 3 may be inserted into a slot, which is provided on a front surface 201A of the casing 201, to be removable.

A system board (e.g., mother board) 202 is arranged inside the casing 201. Various electronic components including the CPU 101, the memory 102, the network controller 105, and the controller 107 are installed on a system board (e.g., mother board) 202. These electronic components functions as the host 2.

As having been described above, according to the above embodiment, the NAND flash memory 5 in the SSD 3 is logically divided into a plurality of storage areas (e.g., VSSD #1, VSSD #2, . . . ), and the upper limit value of the designated total write amount is managed for each VSSD, based on the request from the host 2 that designates a total amount of writable data (i.e., total write amount) for each VSSD. Furthermore, a total amount of data written into the VSSD #1 and a total amount of data written into the VSSD #2 are measured by the controller 4 in the SSD 3. In a case where a measured value of the total amount of data written into the VSSD #1 reaches an upper limit value of the total write amount for the VSSD #1, writing of data into the VSSD #1 from the host 2 is limited by the controller 4. In a case where a measured value of the total amount of data written into the VSSD #2 reaches an upper limit value of the total write amount for the VSSD #2, writing of data into the VSSD #2 from the host 2 is limited by the controller 4.

Accordingly, the host 2 is able to realize various storage areas (e.g., various VSSDs) such as an VSSD for which a large volume of total write amount is permitted or an VSSD for which only a small volume of total write amount is permitted, in a single SSD 3 according to an individual end user's needs without controlling the total write amount into an individual VSSD at all. Accordingly, it is possible to realize a flexible storage service, which is suitable for storage requirements of an individual user, by a single SSD 3.

The data center operator may reset an upper limit value of a total write amount of a VSSD such that the upper limit value of the total write amount of the VSSD is increased, on condition that an end user, who uses a VSSD for which data write is limited, has an extra utilization charge.

Alternatively, the data center operator may increase an over-provisioning capacity of the VSSD on condition that a user, who uses a VSSD for which data write is limited, is charged with an extra utilization charge.

In the above embodiment, a set of the user capacity, the over-provisioning capacity, and the execution time of NAND processing, or the host-side access band width may also be set for each VSSD. Accordingly, it is possible to easily provide a flexible storage service suitable for individual user's storage requirements.

In the above embodiment, a NAND flash memory is exemplified as the nonvolatile memory. However functions according to the embodiments may also be applied to other various nonvolatile memories, for example, a magneto resistive random access memory (MRAM), a phase change random access memory (PRAM), a resistive random access memory (ReRAM), or a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
a host configured such that one or more virtual computing elements run therein; and
a storage device connected to the host, the storage device comprising:
a nonvolatile memory including a plurality of physical memory blocks; and
a controller configured to, during management of the plurality of physical memory blocks in the nonvolatile memory:
receive, from the host, a virtual storage creation command that designates a user capacity and an over-provisioning capacity of each of one or more virtual storage regions associated with the one or more virtual computing elements, the overprovisioning capacity being not recognizable as an available user space from the host,
allocate, on receiving the virtual storage creation command from the host, each of the one or more virtual storage regions associated with the one or more virtual computing elements running in the host, to a memory region in the physical memory blocks of the nonvolatile memory, based on a sum of the user capacity and the over-provisioning capacity designated in the received virtual storage creation command,
maintain, based on the user capacity and the over-provisioning capacity, a threshold value for an amount of data written to the memory region allocated for each of said one or more virtual storage regions,
determine a cumulative amount of data that have been written in the memory region allocated for each of said one or more virtual storage regions, and
restrict writing of data with respect to a memory region for which the cumulative amount exceeds the threshold value.

2. The information processing system according to claim 1, wherein the one or more virtual computing elements include a virtual machine.

3. The information processing system according to claim 1, wherein the one or more virtual computing elements include a container that runs on top of an operating system of the host.

4. The information processing system according to claim 1, wherein the information processing system is configured to generate charge of a fee in accordance with the threshold value with respect to each of the one or more virtual storage regions.

5. The information processing system according to claim 4, wherein the fee increases as the threshold value increases.

6. The information processing system according to claim 1, wherein the information processing system is configured to generate charge of a fee in accordance with a ratio of the user capacity divided by the over-provisioning capacity with respect to each of the one or more virtual storage regions.

7. The information processing system according to claim 6, wherein the fee increases as the ratio decreases.

8. The information processing system according to claim 1, further comprising:
one or more end user terminals connected to the host over a network, the one or more virtual computing elements being operable by the one or more end user terminals.

9. The information processing system according to claim 8, wherein the user capacity in the virtual storage creation command is designatable by the one or more end user terminals.

10. The information processing system according to claim 9, wherein the over-provisioning capacity in the virtual storage creation command is designatable by the one or more end user terminals.

11. A method of operating an information processing system including a host configured such that one or more virtual computing elements run therein and a storage device connected to the host and including a nonvolatile memory having a plurality of physical memory blocks, the method comprising, during management of the plurality of physical memory blocks in the nonvolatile memory:
receiving, by the storage device, a virtual storage creation command from the host, the virtual storage creation command designating a user capacity and an over-provisioning capacity of each of one or more virtual storage regions associated with the one or more virtual computing elements, the overprovisioning capacity being not recognizable as an available user space from the host;
allocating, by the storage device, on receiving the virtual storage creation command from the host, each of the one or more virtual storage regions associated with the one or more virtual computing elements running in the host, to a memory region in the physical memory blocks of the nonvolatile memory, based on a sum of the user capacity and the over-provisioning capacity designated in the received virtual storage creation command;
maintaining, by the storage device, based on the user capacity and the over-provisioning capacity, a threshold value for an amount of data written to the memory region allocated for each of said one or more virtual storage regions;
determining, by the storage device, a cumulative amount of data that have been written in the memory region allocated for each of said one or more virtual storage regions; and
restricting, by the storage device, writing of data with respect to a memory region for which the cumulative amount exceeds the threshold value.

12. The method according to claim 11, wherein the one or more virtual computing elements include a virtual machine.

13. The method according to claim 11, wherein the one or more virtual computing elements include a container that runs on top of an operating system of the host.

14. The method according to claim 11, further comprising:
generating charge of a fee in accordance with the threshold value with respect to each of the one or more virtual storage regions.

15. The method according to claim 14, wherein the fee increases as the threshold value increases.

16. The method according to claim 11, further comprising:
generating charge of a fee in accordance with a ratio of the user capacity divided by the over-provisioning capacity with respect to each of the one or more virtual storage regions.

17. The method according to claim 16, wherein the fee increases as the ratio decreases.

18. The method according to claim 11, wherein the information processing system further includes one or more end user terminals connected to the host over a network, and the one or more virtual computing elements are operable by the one or more end user terminals.

19. The method according to claim 18, wherein the user capacity in the virtual storage creation command is designatable by the one or more end user terminals.

20. The method according to claim 19, wherein the over-provisioning capacity in the virtual storage creation command is designatable by the one or more end user terminals.

* * * * *